(12) United States Patent
Morita

(10) Patent No.: US 8,151,063 B2
(45) Date of Patent: Apr. 3, 2012

(54) INFORMATION PROCESSING APPARATUS AND METHOD

(75) Inventor: Toshihiro Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 11/075,083

(22) Filed: Mar. 8, 2005

(65) Prior Publication Data

US 2005/0146995 A1     Jul. 7, 2005

Related U.S. Application Data

(63) Continuation of application No. 10/415,513, filed on Sep. 29, 2003.

(30) Foreign Application Priority Data

Aug. 31, 2001 (JP) ................................. 2001-262935

(51) Int. Cl.
*G06F 12/00* (2006.01)

(52) U.S. Cl. ........ 711/154; 711/103; 711/170; 709/213; 710/5

(58) Field of Classification Search .................. 711/103, 711/154, 170; 709/213; 710/5
See application file for complete search history.

(56) References Cited

U.S. PATENT DOCUMENTS

| | | |
|---|---|---|
| 5,559,945 A | 9/1996 | Beaudet et al. |
| 5,583,993 A | 12/1996 | Foster et al. |
| 5,616,876 A | 4/1997 | Cluts |
| 5,640,566 A | 6/1997 | Victor et al. |
| 5,666,530 A | 9/1997 | Clark et al. |
| 5,710,922 A | 1/1998 | Alley et al. |
| 5,721,949 A | 2/1998 | Smith et al. |
| 5,727,202 A | 3/1998 | Kucala |
| 5,732,216 A | 3/1998 | Logan et al. |

(Continued)

FOREIGN PATENT DOCUMENTS

CA     1 171 172     7/1984

(Continued)

OTHER PUBLICATIONS

Real Jukebox2 FAQ for Diamond Rio 500 Player, Jun. 6, 2001 as found on <service.real.com/help/faq/rjb2/diamondrio500.html> and accessed through the WaybackMachine at <www.archive.org> through the Jun. 6, 2001 backup copy.*

(Continued)

*Primary Examiner* — Matthew Bradley
(74) *Attorney, Agent, or Firm* — Oblon, Spivak, McClelland, Maier & Neustadt, L.L.P.

(57) ABSTRACT

The present invention relates to information processing apparatuses. A content to be checked out is stored in an automatic-checking-out-destination storage section 113 from musical-piece-file storage sections 108-1 and 108-2 for each external-unit/-medium ID which identifies a PD 5. A GUI section 101 determines through a transfer processing section 103 and a PD plug-in 111 whether the PD 5 has been connected. When it is determined that the PD 5 has been connected, a musical-piece file is checked out from the musical-piece-file storage sections 108 to the PD 5 through a musical-piece management section 104, a file search section 106, and a data base 107 according to the information of the content to be checked out stored in the automatic-checking-out-destination storage section 113. The present invention can be applied to music reproduction software.

48 Claims, 28 Drawing Sheets

U.S. PATENT DOCUMENTS

| | | | |
|---|---|---|---|
| 5,739,451 | A | 4/1998 | Winksy et al. |
| 5,771,330 | A | 6/1998 | Takano et al. |
| 5,835,721 | A | 11/1998 | Donahue et al. |
| 5,835,732 | A | 11/1998 | Kikinis et al. |
| 5,857,201 | A * | 1/1999 | Wright et al. ............ 1/1 |
| 5,864,868 | A | 1/1999 | Contois |
| 5,884,323 | A | 3/1999 | Hawkins et al. |
| 5,913,215 | A * | 6/1999 | Rubinstein et al. ......... 707/10 |
| 5,918,303 | A | 6/1999 | Yamaura et al. |
| 5,923,757 | A | 7/1999 | Hocker et al. |
| 6,006,274 | A | 12/1999 | Hawkins et al. |
| 6,041,023 | A | 3/2000 | Lakhansingh |
| 6,097,557 | A | 8/2000 | Inoue et al. |
| 6,125,369 | A | 9/2000 | Wu et al. |
| 6,154,214 | A | 11/2000 | Uyehara et al. |
| 6,172,948 | B1 | 1/2001 | Keller et al. |
| 6,205,448 | B1 | 3/2001 | Kruglikov et al. |
| 6,208,044 | B1 | 3/2001 | Viswanadham et al. |
| 6,216,131 | B1 | 4/2001 | Liu et al. |
| 6,248,946 | B1 | 6/2001 | Dwek |
| 6,272,545 | B1 | 8/2001 | Flanagin et al. |
| 6,295,541 | B1 | 9/2001 | Bodnar et al. |
| 6,331,867 | B1 | 12/2001 | Eberhard et al. |
| 6,336,028 | B1 | 1/2002 | Okamoto et al. |
| 6,341,316 | B1 | 1/2002 | Kloba et al. |
| 6,345,256 | B1 | 2/2002 | Milsted et al. |
| 6,351,736 | B1 | 2/2002 | Weisberg et al. |
| 6,393,430 | B1 | 5/2002 | Van Ryzin |
| 6,423,892 | B1 * | 7/2002 | Ramaswamy ............ 84/609 |
| 6,434,103 | B1 | 8/2002 | Shitara et al. |
| 6,446,080 | B1 | 9/2002 | Van Ryzin et al. |
| 6,449,607 | B1 | 9/2002 | Tomita et al. |
| 6,493,758 | B1 | 12/2002 | McClain |
| 6,505,160 | B1 | 1/2003 | Levy et al. |
| 6,523,124 | B1 | 2/2003 | Lunsford et al. |
| 6,587,403 | B1 | 7/2003 | Keller et al. |
| 6,587,404 | B1 | 7/2003 | Keller et al. |
| 6,603,506 | B2 | 8/2003 | Ogawa et al. |
| 6,621,768 | B1 | 9/2003 | Keller et al. |
| 6,636,773 | B1 | 10/2003 | Tagawa et al. |
| 6,636,873 | B1 | 10/2003 | Carini et al. |
| 6,658,496 | B1 | 12/2003 | Minakata et al. |
| 6,665,803 | B2 | 12/2003 | Lunsford et al. |
| 6,718,348 | B1 | 4/2004 | Novak et al. |
| 6,731,312 | B2 | 5/2004 | Robbin |
| 6,784,925 | B1 | 8/2004 | Tomat et al. |
| 6,785,542 | B1 | 8/2004 | Blight et al. |
| 6,794,566 | B2 | 9/2004 | Pachet |
| 6,801,964 | B1 | 10/2004 | Mahdavi |
| 6,871,009 | B1 | 3/2005 | Suzuki |
| 7,028,082 | B1 * | 4/2006 | Rosenberg et al. ......... 709/223 |
| 2001/0021053 | A1 | 9/2001 | Colbourne et al. |
| 2001/0041021 | A1 | 11/2001 | Boyle et al. |
| 2001/0052123 | A1 | 12/2001 | Kawai |
| 2001/0056434 | A1 | 12/2001 | Kaplan et al. |
| 2002/0002413 | A1 | 1/2002 | Tokue |
| 2002/0013784 | A1 | 1/2002 | Swanson |
| 2002/0046315 | A1 | 4/2002 | Miller et al. |
| 2002/0055934 | A1 | 5/2002 | Lipscomb et al. |
| 2002/0116082 | A1 * | 8/2002 | Gudorf ............ 700/94 |
| 2002/0138606 | A1 | 9/2002 | Robison |
| 2002/0157002 | A1 * | 10/2002 | Messerges et al. ......... 713/155 |
| 2002/0161865 | A1 | 10/2002 | Nguyen |
| 2002/0174269 | A1 | 11/2002 | Spurgat et al. |
| 2003/0014333 | A1 * | 1/2003 | Brown ............ 705/28 |
| 2003/0014496 | A1 * | 1/2003 | Spencer et al. ............ 709/217 |
| 2003/0037254 | A1 | 2/2003 | Fischer et al. |
| 2003/0046434 | A1 | 3/2003 | Flanagin et al. |
| 2003/0074457 | A1 | 4/2003 | Kluth |
| 2003/0079038 | A1 | 4/2003 | Robbin et al. |
| 2003/0167318 | A1 | 9/2003 | Robbin et al. |
| 2003/0206723 | A1 | 11/2003 | Ando et al. |
| 2004/0001395 | A1 | 1/2004 | Keller et al. |
| 2004/0001396 | A1 | 1/2004 | Keller et al. |
| 2004/0015703 | A1 * | 1/2004 | Madison et al. ............ 713/185 |
| 2004/0027931 | A1 | 2/2004 | Morita |
| 2004/0055446 | A1 | 3/2004 | Robbin et al. |
| 2004/0076086 | A1 | 4/2004 | Keller et al. |
| 2004/0225762 | A1 | 11/2004 | Poo |

FOREIGN PATENT DOCUMENTS

| | | |
|---|---|---|
| CA | 2 464 102 | 5/2003 |
| EP | 0 438 299 | 7/1991 |
| EP | 0 467 208 | 9/1995 |
| EP | 0 803 873 | 10/1997 |
| EP | 0 820 179 | 1/1998 |
| EP | 0 899 929 | 3/1999 |
| EP | 0 909 089 | 4/1999 |
| EP | 0 917 077 | 5/1999 |
| EP | 0 982 732 | 3/2000 |
| EP | 1 028 425 | 8/2000 |
| EP | 1 037 180 | 9/2000 |
| EP | 1 098 211 | 5/2001 |
| EP | 1 098 212 | 5/2001 |
| EP | 1 152 397 | 11/2001 |
| EP | 1 154 403 | 11/2001 |
| EP | 1 156 477 A1 | 11/2001 |
| GB | 2 103 865 | 2/1983 |
| GB | 2 387 001 | 10/2003 |
| JP | 58-17576 | 2/1983 |
| JP | 04-271396 | 9/1992 |
| JP | 2735731 | 1/1998 |
| JP | 11-306057 | 11/1999 |
| JP | 2001-76464 | 3/2001 |
| JP | 2001-143443 | 5/2001 |
| WO | WO 95/16950 | 6/1995 |
| WO | WO 99/54870 | 10/1999 |
| WO | WO 00/25154 | 5/2000 |
| WO | WO 01/33569 | 5/2001 |
| WO | WO 01/37257 | 5/2001 |
| WO | WO 01/45085 A1 | 6/2001 |
| WO | WO 01/67753 | 9/2001 |
| WO | WO 02/25610 | 3/2002 |
| WO | WO 03/023786 | 3/2003 |
| WO | WO 03/036541 | 5/2003 |

OTHER PUBLICATIONS

Steinberg, "Sonicblue Rio Car," Product Review, Dec. 12, 2000 http://electronics.cnet.com/electronics/0-6342420-1304-4098389.html.

Compaq, "The Personal Jukebox," Jan. 24, 2001 http://research.compaq.com/SRC/pib/.

iTunes, Playlist Related Help Screens, iTunes v. 1.0, Apple Computer, Inc., Jan. 2001.

Specification Sheet, iTunes 2, Apple Computer, Inc., Oct. 31, 2001.

iTunes 2, Playlist Related Help Screens, iTunes v. 2.0, Apple Computer, Inc., Oct. 23, 2001.

SoundJamp MP Plus, Representative Screens, published by Casady and Greene, Inc., Salinas, CA 2000.

"SoundJam MP Plus Manual, ver. 2.0"—MP3 Player and Encoder for Macintosh by Jeffrey Robbin, Bill Kincaid and Dave Heller.

"SDMI Secure Digital Music Initiative," *SDMI Portable Device Specification*, Part 1, Ver. 1.0, Jul. 8, 1999, pp. 1-35, XP000997330.

Firewire (also known as Sony's iLink or IEEE 1394), Wikipedia (1995). Jan. 24, 2006 <http://en.wikipedia.org/wiki/Firewire>.

De Herrera, Chris, "Microsoft ActiveSync 3.1," Ver. 1.02 (Oct. 13, 2000). Jan. 24, 2006 <http://www.pocketpcfaq.com/wce/activesync3.1.htm>.

Birrell, Andrew, "Personal Jukebox (PJB)," Compaq Systems Research Center and PAAD (Oct. 13, 2000). Jan. 24, 2006 <http://birrell.org/andrew/talks/pjb-overview.ppt>.

Butler, Travis, "Portable MP3: The Nomad Jukebox," Tidbits.com (Jan. 8, 2001). Jan. 24, 2006 <http://db.tidbits.com/getbits.acgi?tbart=06261>.

Butler, Travis, "Archos Jukebox 6000 Challenges Nomad Jukebox," Tidbits.com (Aug. 13, 2001). Jan. 24, 2006 <http://db.tidbits.com/getbits.acgi??tbart=06521>.

Engst, Adam C., "SoundJam Keeps on Jammin'," Tidbits.com (Jun. 19, 2000). Jan 24, 2006 <http://db.tidbits.com/getbits.acgi?tbart=05988>.

Musicmatch, "Musicmatch and Xing Technology Introduce Musicmatch Jukebox," May 18, 1998. Jan. 24, 2006 <http://www.musicmatch.com/info/company/press/releases/?year=1998&release=2>.

"Nomad Jukebox, User Guide (On-line Version)," Creative Technology, Ltd., Ver. 1.0, Feb. 2001. Jan. 24, 2006 <http://ccftp.creative.com/manualdn/Manuals/TSD/2424/Jukebox.pdf>.

"Apple's iPod Available in Stores Tomorrow," Press Release, Apple Computer, Inc. (Nov. 9, 2001). Jan. 25, 2006 <http://www.apple.com/pr/library/2001/nov/09ipod.html>.

"Apple Introduces iTunes—World's Best and Easiest to Use Jukebox Software," Press Release, Apple Computer, Inc. (Jan. 9, 2001). Jan. 25, 2006 <http://www.apple.com/pr/library/2001/jan/09itunes.html>.

"Apple Announces iTunes 2," Press Release, Apple Computer, Inc. (Oct. 23, 2001). Jan. 25, 2006 <http://www.apple.com/pr/library/2001/oct/23itunes.html>.

Chakarova, Mimi, et al., "Digital Still Cameras—Downloading Images to a Computer," Multimedia Reporting and Convergence. Jan. 25, 2006 <http://journalism.berkeley.edu/multimedia/tutorials/stillcams/downloading.html>.

"Kogata Memory Card de Ongaku Chosakuken wo Mamoru," Nikkei Electronics, Vo. 739, Mar. 22, 1999, pp. 49-53 with partial english translation.

Miniman, Jared, "Applian Software's Replay Radio and Player vol. 1.02," pocketnow.com, Product Review (Jul. 31, 2001). Jan. 24, 2006 <http://www.pocketnow.com/index.php?a=portal_detail&t=reviews&id=139>.

Personal Jukebox (PJB), Systems Research Center and PAAD, Compaq Computer Corp., Oct. 13, 2000.

U.S. Appl. No. 12/139,552, filed Jun. 16, 2008, Matsumoto, et al.

\* cited by examiner

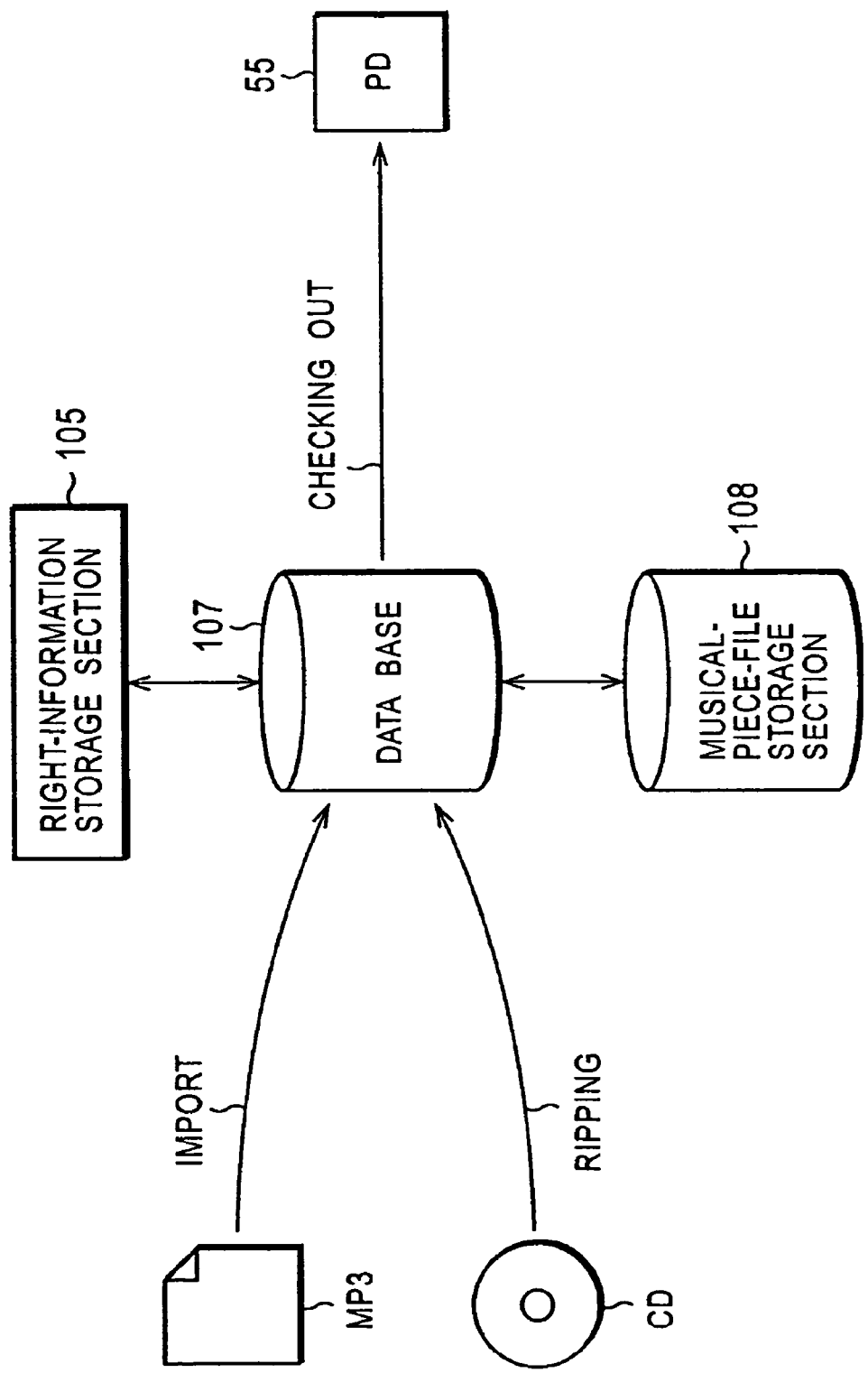

FIG. 8

| CHECKING-OUT METHODS | EXAMPLE DESCRIPTIONS |
|---|---|
| MUSICAL PIECES RECENTLY LISTENED TO | ObjectSpecId=2<br>FilterPropertySpecId=303<br>Filter=%s>0<br>SortPropertySpecId=303<br>Asc=-1 |
| MUSICAL PIECES CHECKED OUT A SMALL NUMBER OF TIMES | ObjectSpecId=2<br>SortPropertySpecId=1146<br>Asc=1 |
| MUSICAL PIECES ON A FAVORITE PLAY LIST | Algorithm=Favarite |
| MUSICAL PIECES SELECTED AT RANDOM | Algorithm=random |
| PLAY LIST SELECTED AT RANDOM | Algorithm=randomPlayList |
| SPECIFY GENRE | ObjectSpecId=2<br>FilterPropertySpecId=200<br>Filter=%s Like '%%%1%%'<br>SortPropertySpecId=200<br>Asc=1<br>ParamCount=1<br>ParamName1=GENRENAME<br>ParamKey1=Genre |
| SPECIFY PLAY LIST | ObjectSpecId=2<br>Algorithm=PlayList<br>ParamCount=1<br>ParamName1=PLAYLISTNAME<br>ParamKey1=PlayList |

FIG. 9

| EXTERNAL-UNIT/-MEDIUM NAME | EXTERNAL-UNIT/-MEDIUM NAME | CHECKING-OUT ITEM-1 | VARIABLE-1 | CHECKING-OUT ITEM-2 | VARIABLE-2 |
|---|---|---|---|---|---|
| 0101A13460100 1479FFFF000012D103 | MEMORY CARD A | MUSICAL PIECES RECENTLY LISTENED TO | — | NONE | |
| B059DE7742040 6004DC2000009005000 | MEMORY CARD B | SPECIFY GENRE | Blues | SPECIFY PLAY LIST | My Favorites |

INFORMATION PROCESSING APPARATUS AND METHOD

This is a Continuation Application of U.S. Ser. No. 10/415,513, filed on Sep. 29, 2003, which is hereby incorporated by reference in its entirety herein.

TECHNICAL FIELD

The present invention relates to information processing apparatuses and methods, and more particularly, to an information processing apparatus and an information processing method for more easily executing a process for selecting a desired data item from a plurality of data items (such as the contents of music data and image data) and for recording it in a recording medium.

BACKGROUND ART

As digital technologies have been spread, various contents (data) formed of music data, image data, and others have been recorded in recording media or reproduced, in a digital manner in recent years. With such digitization, HDDs (hard disc drives) of personal computers and other recording media have also had larger capacities. Therefore, the user can now manage a huge amount of contents by personal computers and others.

In a typical example, a personal computer has a function for reproducing a great number of musical contents, which is generally called a jukebox, and software reproduces musical contents recorded in its HDD and others.

This jukebox software can search for a desired musical content according to a predetermined condition and reproduce it. When the user inputs "bossa nova" as a search condition, for example, only a recorded musical content having a genre of "bossa nova" is selected and reproduced among the musical contents recorded in the HDD. With such a process, the user can easily reproduce a musical content in a desired genre without searching a great number of contents stored in the HDD one by one.

When the selected musical content is recorded in a recording medium such as a memory card and reproduced by a portable musical-content player apparatus having a jukebox function such as that described above, the user usually executes a selection process for selecting a musical content to be recorded in the recording medium on a personal computer, and further performs a recording process for recording the selected musical content in the recording medium. In other words, the user needs to execute two processes, the selection process and the recording process, to transfer the musical content to the recording medium.

In addition, since the number of musical contents to be recorded in the recording medium is generally limited, the user wants to execute a process for changing the recorded contents after repeated listening for a certain period because the user feels redundant. Then, the user mounts the recording medium to the personal computer, deletes the contents recorded in the recording medium, and performs the selection process and the recording process to record different musical contents in the recording medium.

Therefore, the user needs to repeat the deletion process, the selection process, and the recording process at a certain time interval on the personal computer by activating the above-described software. Operations therefor are troublesome.

DISCLOSURE OF INVENTION

The present invention has been made in consideration of the foregoing condition. An object of the present invention is to allow a process for changing musical contents recorded in a recording medium by using musical contents recorded in a personal computer or others to be performed easily.

An information processing apparatus according to the present invention is characterized by comprising reading means for reading data recorded in a recording medium; data storage means for storing data which includes the data read by the reading means; extracting means for extracting data corresponding to a predetermined condition from the data stored in the data storage means; and data recording means for recording the data extracted by the extracting means in the recording medium.

The predetermined condition may include musical pieces recently listened to, musical pieces checked out a small number of times, musical pieces on a favorite play list, musical pieces selected at random, a play list selected at random, genre designation, and play-list designation.

The information processing apparatus may be configured such that it further includes condition storage means for storing a plurality of predetermined conditions; and selection means for selecting any predetermined condition among the plurality of predetermined conditions, and the extracting means extracts data corresponding to the any predetermined condition selected by the selection means, from the data stored in the data storage means.

The information processing apparatus may be configured such that the selection means selects in advance the any predetermined condition among the plurality of predetermined conditions, the apparatus further includes selected-condition storage means for storing the any predetermined condition selected in advance by the selection means, and the extracting means extracts data corresponding to the any predetermined condition selected in advance and stored in the selected-condition storage means, from the data stored in the data storage means.

The information processing apparatus may be configured such that it further includes condition storage means for storing a plurality of predetermined conditions; and selection means for selecting a plurality of any predetermined conditions from the plurality of predetermined conditions, and the extracting means extracts data corresponding to the plurality of any predetermined conditions selected by the selection means, from the data stored in the data storage means.

The information processing apparatus may be configured such that the selection means selects in advance the plurality of any predetermined conditions from the plurality of predetermined conditions, the apparatus further includes selected-condition storage means for storing the plurality of any predetermined conditions selected in advance by the selection means, and the extracting means extracts data corresponding to the plurality of any predetermined conditions selected in advance and stored in the selected-condition storage means, from the data stored in the data storage means.

The information processing apparatus may be configured such that the selection means selects in advance the plurality of any predetermined conditions from the plurality of predetermined conditions, the apparatus further includes selected-condition storage means for storing the plurality of any predetermined conditions selected in advance by the selection means, the extracting means extracts data corresponding to the plurality of any predetermined conditions selected in advance and stored in the selected-condition storage means, from the data stored in the data storage means, and the data recording means records the data extracted by the extracting means in the recording medium such that data corresponding to the any predetermined conditions can be read in a predetermined order.

The information processing apparatus may be configured such that it further includes recording-medium-identifying-ID reading means for reading an ID which identifies the recording medium, the condition storage means stores a plurality of predetermined conditions for each ID, and the selection means selects any predetermined condition among the plurality of predetermined conditions according to the ID.

The information processing apparatus may be configured such that it further includes condition recording means for recording the predetermined condition in the recording medium; and condition reading means for reading the predetermined condition recorded in the recording medium, and the extracting means extracts data corresponding to the predetermined condition read by the condition reading means, from the data stored in the data storage means.

The data recording means may record the data extracted by the extracting means such that the remaining capacity of the recording medium becomes smaller.

An information processing method according to the present invention is characterized by comprising a reading step of reading data recorded in a recording medium; a data storage step of storing data which includes the data read in the process of the reading step; an extracting step of extracting data corresponding to a predetermined condition from the data stored in the process of the data storage step; and a data recording step of recording the data extracted in the process of the extracting step in the recording medium.

A program according to the present invention is characterized by making a computer execute a reading control step of controlling reading of data recorded in a recording medium; a data storage control step of controlling storage of data which includes the data read in the process of the reading control step; an extracting control step of controlling extraction of data corresponding to a predetermined condition from the data stored in the process of the data storage control step; and a data recording control step of controlling recording of the data extracted in the process of the extracting control step in the recording medium.

In an information processing apparatus, an information processing method, and a program according to the present invention, data recorded in a recording medium is read, data which includes the read data is stored, data corresponding to a predetermined condition is extracted from the stored data, and the extracted data is recorded in the recording medium.

BRIEF DESCRIPTION OF THE DRAWINGS

FIG. 7 is a view showing a content encryption process, a process for adding right information to a corresponding content, and a process for converting a content encoding method.

FIG. 8 is a view showing example descriptions of the definition files of checking-out methods stored in an automatic-checking-out-item storage section shown in FIG. 3.

FIG. 9 is a view showing information stored in an automatic-checking-out-destination storage section shown in FIG. 3.

BEST MODE FOR CARRYING OUT THE INVENTION

Figure 1:
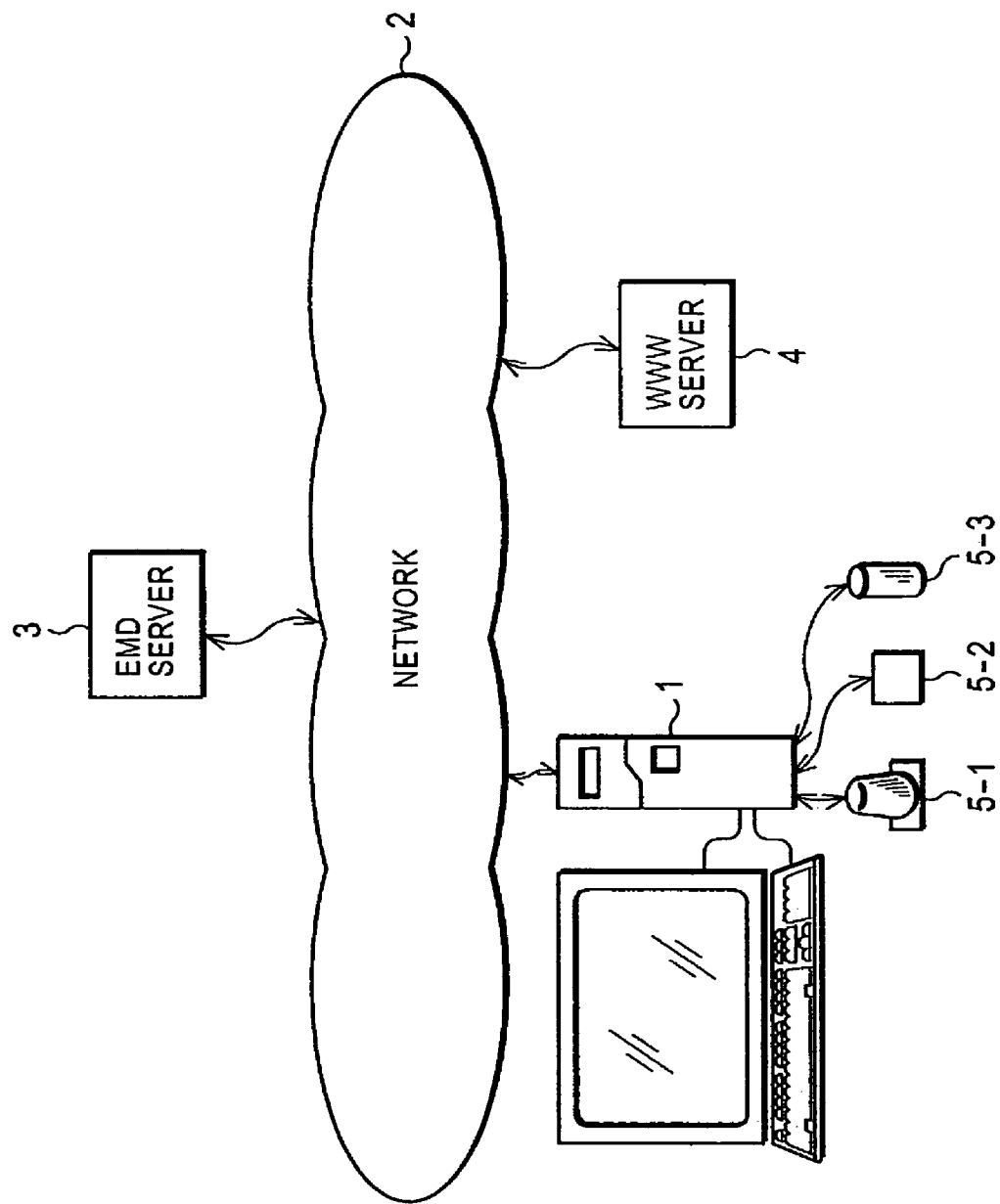
FIG. 1 is a view showing a content-data management system according to an embodiment of the present invention.

FIG. 1 is a view showing a content-data management system according to an embodiment of the present invention. A personal computer 1 is connected to a network 2 formed of a local area network or the Internet. The personal computer 1 records musical data (hereinafter called a content) received from an EMD (electronic music distribution) server 3, or read from a CD (compact disc) as is, or converts the data to have a predetermined encoding method (such as ATRAC3 (trademark)), encrypts it by an encryption method such as DES (data encryption standard), and records it.

The personal computer 1 records right information indicating the use condition of the content, correspondingly to the content not-encrypted or encrypted, and recorded.

The right information indicates, for example, the number (number of portable devices which can perform so-called checking out, described later) of portable devices (also called PDs) which can use at the same time the content corresponding to the right information. Even when the content is checked out the same number of times as the number indicated by the right information, the personal computer 1 can reproduce the content.

The right information also indicates information of whether the content is allowed to be copied. When the content is copied onto portable devices 5-1 to 5-3, the personal computer 1 can reproduce the recorded content. The number of times the content is allowed to be stored in the portable devices 5-1 to 5-3 is limited in some cases. In these cases, the number of times the content is allowed to be copied is not increased.

In addition, the right information indicates information of whether the content is allowed to be moved to another personal computer. After the content is moved to the portable devices 5-1 to 5-3, the personal computer 1 cannot use the recorded content (because the content is deleted or the right information thereof is changed).

Details of the right information will be described later.

The personal computer 1 stores encoded and recorded contents together with data (such as the titles of musical pieces or reproduction conditions) related to the contents in the connected portable device 5-1 through a USB (universal serial bus) cable, and updates the right information corresponding to the stored contents (hereinafter collectively called performs checking out) when the portable device 5-1 has stored the contents. More precisely, when checking out is performed, the number of times the right information can be checked out, the number being recorded in the personal computer 1, is reduced by one. When the number of times checking out is allowed is zero, the corresponding content cannot be checked out.

The personal computer 1 stores encoded and recorded contents together with data related to the contents in the connected portable device 5-2 through a USB cable, and updates the right information corresponding to the stored contents when the portable device 5-2 has stored the contents. The personal computer 1 stores encoded and recorded contents together with data related to the contents in the connected portable device 5-3 through a USB cable, and updates the right information corresponding to the stored contents when the portable device 5-3 has stored the contents.

The personal computer 1 makes the connected portable device 5-1 delete (or disable in use) a content checked out by the personal computer 1 to the portable device 5-1 through the USB cable, and updates the right information corresponding to the deleted content (hereinafter collectively called performs checking in). More precisely, when checking in is performed, the number of times the right information can be checked out, the number being recorded in the personal computer 1, is increased by one.

The personal computer 1 makes the connected portable device 5-2 delete (or disable in use) a content checked out by the personal computer 1 to the portable device 5-2 through the USB cable, and updates the right information corresponding to the deleted content. The personal computer 1 makes the connected portable device 5-3 delete (or disable in use) a content checked out by the personal computer 1 to the portable device 5-3 through the USB cable, and updates the right information corresponding to the deleted content.

The personal computer 1 cannot check in a content checked out by another personal computer not shown to the portable device 5-1. The personal computer 1 cannot check in a content checked out by another personal computer to the portable device 5-2. The personal computer 1 cannot check in a content checked out by another personal computer to the portable device 5-3.

The EMD server 3 sends contents together with data (such as the titles of musical pieces or reproduction restrictions) related to the contents to the personal computer 1 through the network 2 in response to a request of the personal computer 1.

The contents sent from the EMD server 3 have been encoded by a predetermined encoding method and have been encrypted by a predetermined encryption method. The EMD server 3 sends a key used for decoding the contents to the personal computer 1.

In response to a request from the personal computer 1, a WWW (world wide web) server 4 sends data corresponding to a CD from which its contents have been read (such as the album name of the CD and the sales company of the CD), and data (such as the names of musical pieces and the name of the composer) corresponding to the contents read from the CD, to the personal computer 1 through the network 2.

The portable device 5-1 stores the contents (that is, the checked-out contents and others) sent from the personal computer 1 together with data (such as the titles of musical pieces or reproduction restrictions) related to the contents. The portable device 5-1 reproduces the stored contents according to the data related to the contents and outputs to a headphone not shown and others.

When an attempt is made to reproduce a content, for example, if the number of reproduction times exceeds a reproduction restriction which has been stored as the data related to the content, the portable device 5-1 stops reproducing the corresponding content. When an attempt is made to perform reproduction after the reproduction time limit expires which has been stored as the data related to the content, the portable device 5-1 stops reproducing the corresponding content.

The user can unload the portable device 5-1 which has stored contents, from the personal computer 1, walk with the device, and reproduce a stored content to listen to the music corresponding to the content by a headphone.

The portable device 5-2 stores the contents sent from the personal computer 1 together with data related to the contents. The portable device 5-2 reproduces the stored contents according to the data related to the contents and outputs to a headphone not shown and others. The user can unload the portable device 5-2 which has stored contents, from the personal computer 1, walk with the device, and reproduce a stored content to listen to the music corresponding to the content by a headphone.

The portable device 5-3 stores the contents sent from the personal computer 1 together with data related to the contents. The portable device 5-3 reproduces the stored contents according to the data related to the contents and outputs to a headphone not shown and others. The user can unload the portable device 5-3 which has stored contents, from the personal computer 1, walk with the device, and reproduce a stored content to listen to the music corresponding to the content by a headphone.

Hereinafter, if it is not necessary to individually separate the portable devices 5-1 to 5-3, they are collectively called a portable device 5.

Figure 2:
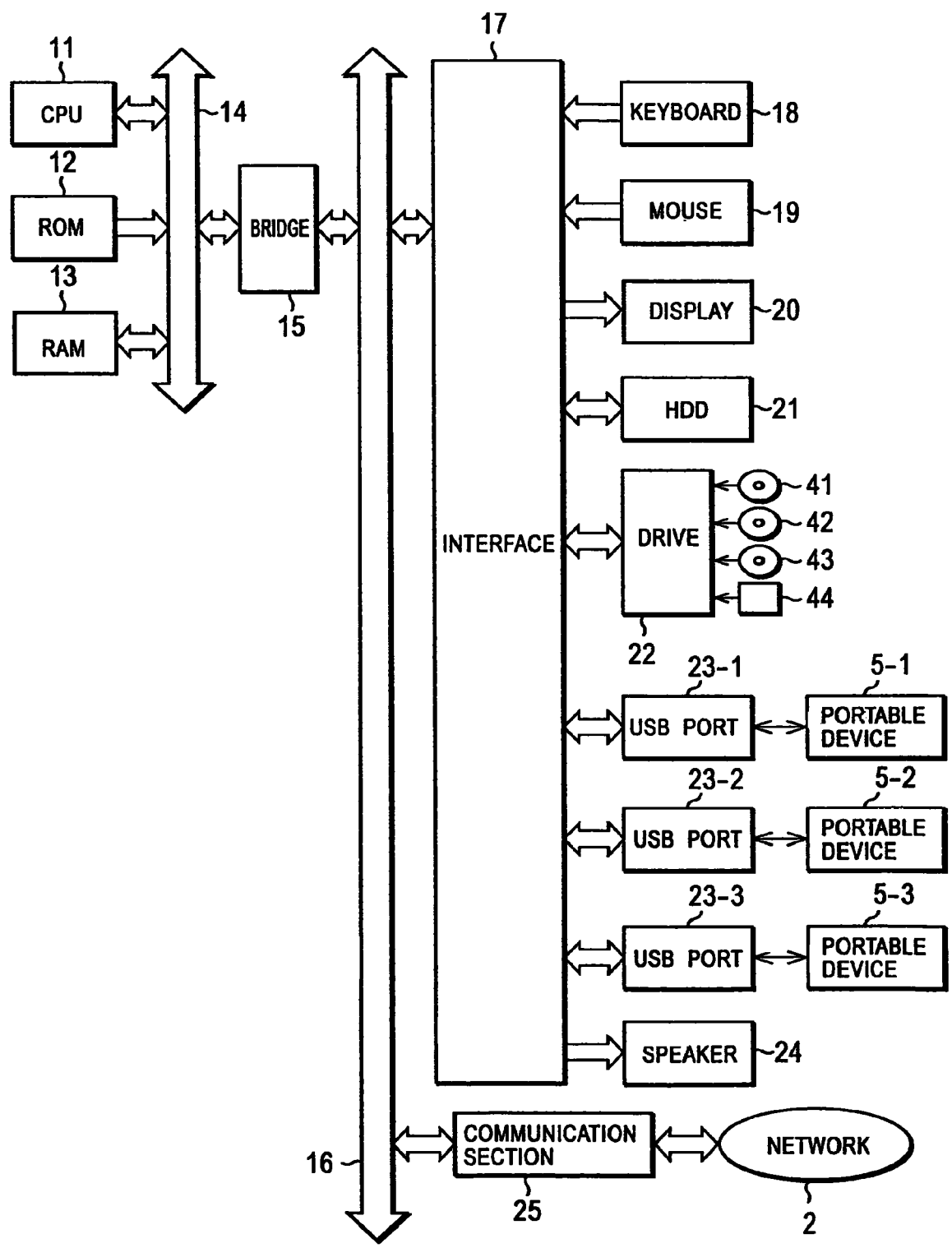
FIG. 2 is a block diagram showing the structure of a personal computer.

FIG. 2 is a view showing the structure of the personal computer 1. A CPU (central processing unit) 11 actually executes various application programs for implementing functions described later and an OS (operating system). A ROM (read-only memory) 12 generally stores basically fixed data among programs and calculation parameters used by the CPU 11. A RAM (random-access memory) 13 stores programs used in an execution performed by the CPU 11 and parameters changed in the execution if necessary. The CPU 11, the ROM 12, and the RAM 13 are connected to each other by a host bus 14 formed of a CPU bus and others.

The host bus 14 is connected to an external bus 16 such as a PCI (peripheral component interconnect/interface) bus through a bridge 15.

A keyboard 18 is operated by the user to input various instructions to the CPU 11. A mouse 19 is operated by the user to specify or select a point on a screen of a display 20. The display 20 is formed of a liquid-crystal display apparatus, a CRT (cathode ray tube), or others, and displays various pieces of information by text and images. An HDD (hard disk drive) 21 drives hard disks to record or reproduce programs executed by the CPU 11 and information into or from the hard disks.

A drive 22 reads data or a program recorded in a loaded magnetic disk 41, a loaded optical disk 42 (including a CD), a loaded magneto-optical disk 43, or a loaded semiconductor memory 44, and sends the data or program to the RAM 13 through an interface 17, the external bus 16, the bridge 15, and the host bus 14.

A USB port 23-1 is connected to the portable device 5-1 through a USB cable. The USB port 23-1 outputs data (such as a content or a command for the portable device 5-1) sent from the HDD 21, the CPU 11, or the RAM 13 through the interface 17, the external bus 16, the bridge 15, and the host bus 14, to the portable device 5-1.

A USB port 23-2 is connected to the portable device 5-2 through a USB cable. The USB port 23-2 outputs data (such as a content or a command for the portable device 5-2) sent from the HDD 21, the CPU 11, or the RAM 13 through the interface 17, the external bus 16, the bridge 15, and the host bus 14, to the portable device 5-2.

A USB port 23-3 is connected to the portable device 5-3 through a USB cable. The USB port 23-3 outputs data (such as a content or a command for the portable device 5-3) sent from the HDD 21, the CPU 11, or the RAM 13 through the interface 17, the external bus 16, the bridge 15, and the host bus 14, to the portable device 5-3.

According to an audio signal sent from the interface 17, a speaker 24 outputs the predetermined sound corresponding to the content.

The keyboard 18, the mouse 19, the display 20, the HDD 21, the drive 22, the USB ports 23-1 to 23-3, and the speaker 24 are all connected to the interface 17, and the interface 17 is connected to the CPU 11 through the external bus 16, the bridge 15, and the host bus 14.

A communication section 25 is connected to the network 2, stores data (such as a request for sending a content) sent from the CPU 11 or the HDD 21 in packets by a predetermined method and sends through the network 2, and outputs data (such as a content) stored in packets received through the network 2, to the CPU 11, the RAM 13, or the HDD 21.

The communication section 25 is connected to the CPU 11 through the external bus 16, the bridge 15, and the host bus 14.

When it is not necessary to distinguish the USB ports 23-1 to 23-3 individually, they are simply called USB ports 23 hereinafter.

Figure 3:
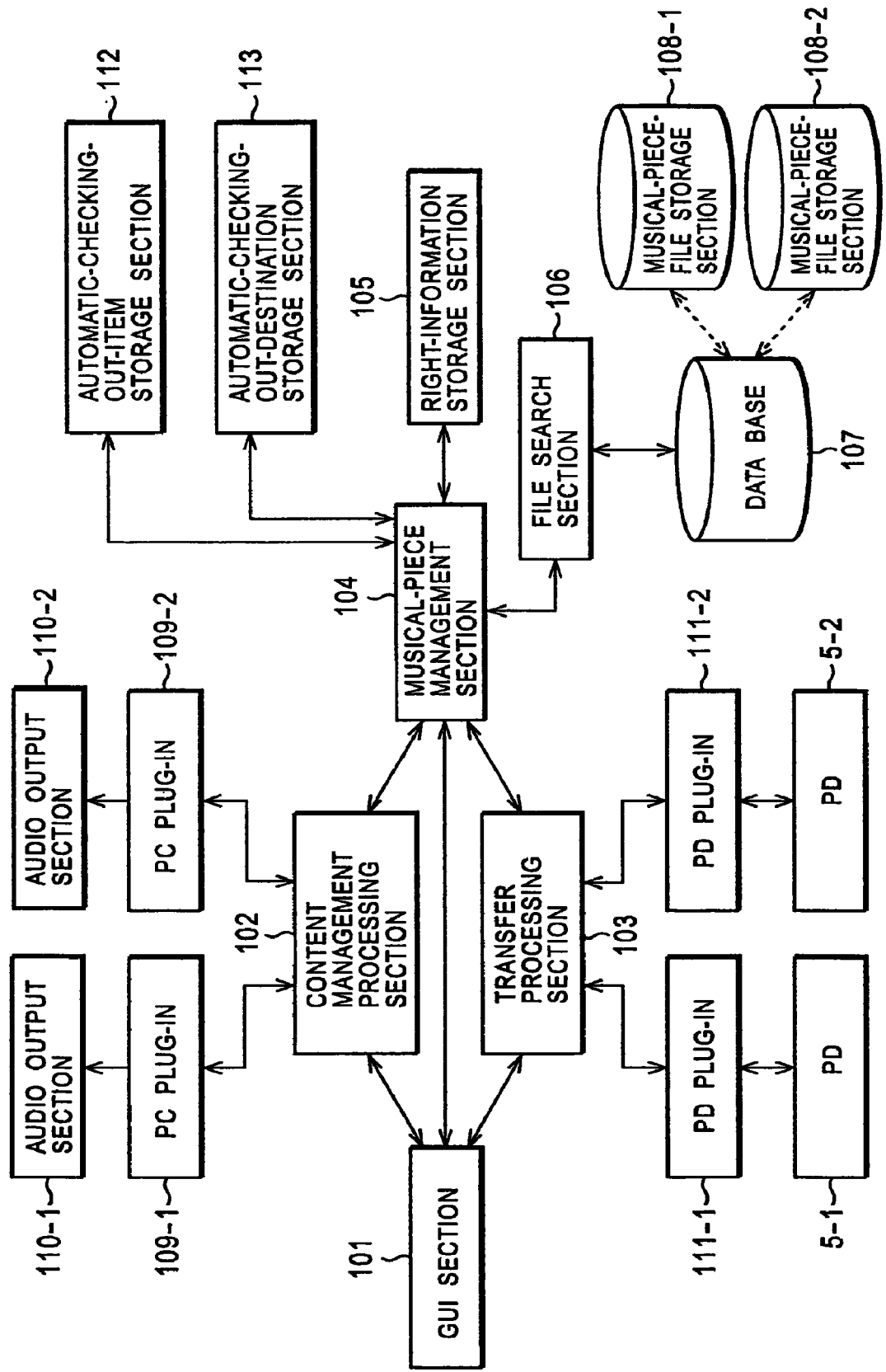
FIG. 3 is a block diagram showing functions of a personal computer.

FIG. 3 is a block diagram showing functions of the personal computer 1, implemented when the CPU 11 executes a content management program. In response to a user's operation at the keyboard 18 or the mouse 19, a GUI (graphical user interface) section 101 sends the name of the musical piece corresponding to the content the user desires or the name of the file which stores the content, and others to a musical-piece management section 104, and also requests from the musical-piece management section 104 the input of the data corresponding to the content into a data base 107. The GUI section 101 controls an operation mode (on and off) of automatic checking in/checking out.

The GUI section 101 obtains data, such as the ID of the musical piece, the name of the musical piece, or an artist name, corresponding to the content from the data base 107 through the musical-piece management section 104, and displays the ID of the musical piece, the name of the musical piece, or the artist name on the display 20. When the user requests the reproduction of the content by a user's operation, the GUI section 101 sends the ID of the musical piece corresponding to the content for which reproduction is requested, to a content management processing section 102, and requests the content management processing section 102 to reproduce the content.

When a content is requested to be transferred (checked out, copied, or moved) by a user's operation or an automatic checking-in/checking-out process, the GUI section 101 sends the ID of the musical piece corresponding to the content for which transfer is requested, to a transfer processing section 103, and requests the transfer processing section 103 to transfer the content.

When the content management processing section 102 receives the request to reproduce the content from the GUI section 101, the content management processing section 102 sends the ID of the musical piece corresponding to the content for which reproduction is requested, to the musical-piece management section 104, and requests the file name corresponding to the content. When the content management processing section 102 obtains the file name from the musical-piece management section 104, the content management processing section 102 obtains the content from a musical-piece-file storage section 108-1 or 108-2 through the musical-piece management section 104, a file search section 106, and the data base 107.

The content management processing section 102 sends the obtained content to a PC (protected content) plug-in 109-1 or 109-2.

When the PC plug-in 109-1 receives the content from the content management processing section 102, if the content is not encrypted, the PC plug-in 109-1 decodes the content, which has been encoded, and sends audio data to a sound output section 110-1. When the PC plug-in 109-1 receives the content from the content management processing section 102, if the content has been encrypted, the PC plug-in 109-1 decrypts the encrypted content to generate a not-encrypted content and decodes it, which has been encoded, and sends audio data to the sound output section 110-1. The sound output section 110-1 generates an audio signal from the audio data and makes the speaker 24 output the sound.

When the PC plug-in 109-2 receives the content from the content management processing section 102, if the content is not encrypted, the PC plug-in 109-2 decodes the content, which has been encoded, and sends audio data to a sound output section 110-2. When the PC plug-in 109-2 receives the content from the content management processing section 102, if the content has been encrypted, the PC plug-in 109-2 decrypts the encrypted content to generate a not-encrypted content and decodes it, which has been encoded, and sends audio data to the sound output section 110-2. The sound output section 110-2 generates an audio signal from the audio data and makes the speaker 24 output the sound.

The user can further install an additional PC plug-in to the personal computer 1.

When it is not necessary to distinguish the PC plug-in 109-1 and the PC plug-in 109-2 individually, they are simply called PC plug-ins 109 hereinafter.

When the transfer processing section 103 is requested by the GUI section 101 to transfer a content, the transfer processing section 103 sends the ID of the musical piece corresponding to the content for which transfer has been requested, to the musical-piece management section 104, and also requests the name of the file corresponding to the content. When the transfer processing section 103 obtains the file name from the musical-piece management section 104, the transfer processing section 103 obtains the content corresponding to the file name from the musical-piece storage section 108-1 or 108-2 through the musical-piece management section 104, the file search section 106, and the data base 107.

The transfer processing section 103 sends the obtained content to a PD plug-in 111-1 or 111-2.

When the PD plug-in 111-1 sends a content to the portable device 5-1, the PD plug-in 111-1 perform mutual authentication with the portable device 5-1. When the mutual authentication fails, the PD plug-in 111-1 does not send the content to the portable device 5-1.

When the PD plug-in 111-1 receives a content from the transfer processing section 103, if the content has been encrypted, the PD plug-in 111-1 sends the content together with data related to the content to the portable device 5-1. When the PD plug-in 111-1 receives a content from the transfer processing section 103, if the content has not been encrypted, the PD plug-in 111-1 encrypts the content, and sends the encrypted content together with data related to the content to the portable device 5-1.

The mutual authentication may be performed when the portable device 5-1 is connected to the personal computer 1.

When the PD plug-in 111-2 sends a content to the portable device 5-2, the PD plug-in 111-2 perform mutual authentication with the portable device 5-2. When the mutual authentication fails, the PD plug-in 111-2 does not send the content to the portable device 5-1.

When the PD plug-in 111-2 receives a content from the transfer processing section 103, if the content has been encrypted, the PD plug-in 111-2 sends the content together with data related to the content to the portable device 5-2. When the PD plug-in 111-2 receives a content from the transfer processing section 103, if the content has not been encrypted, the PD plug-in 111-2 encrypts the content, and sends the encrypted content together with data related to the content to the portable device 5-2.

The mutual authentication may be performed when the portable device 5-2 is connected to the personal computer 1.

The user can further install an additional PD plug-in to the personal computer 1.

When it is not necessary to distinguish the PD plug-in 111-1 and the PD plug-in 111-2 individually, they are simply called PD plug-ins 111 hereinafter.

The musical-piece management section 104 stores the content stored in a file recorded in the HDD 21 or the content sent from the content management processing section 102 in a file and records it in the musical-piece-file storage section 108-1 or 108-2 through the data base 107.

The musical-piece management section 104 records data such as the name of the musical piece corresponding to a content and the name of the file corresponding to the content in the data base 107, and reads the name of a musical piece or the name of a file from the data base 107. When the musical-piece management section 104 receives the name of a musical piece or the name of a file from the GUI section 101, the musical-piece management section 104 adds a record and records the name of the musical piece or the name of the file as an item in the record in the data base 107.

In response to a request from the GUI section 101, the musical-piece management section 104 reads all the names of musical pieces and all the IDs of the musical pieces recorded in the data base 107, from the data base 107, and sends them to the GUI section 101.

When the musical-piece management section 104 receives the ID of a musical piece from the content management processing section 102, the musical-piece management section 104 reads the name of the file corresponding to the ID of the musical piece from the data base 107, and sends the read file name to the content management processing section 102. When the musical-piece management section 104 receives the ID of a musical piece from the transfer processing section 103, the musical-piece management section 104 reads the name of the file corresponding to the ID of the musical piece from the data base 107, and sends the read file name to the transfer processing section 103.

In the automatic checking-in/checking-out process, the musical-piece management section 104 reads information describing a checking-out item (checking-out method) for each PD 5 from an automatic-checking-out-destination storage section 113, and reads a content from the musical-piece-file storage section 108 through the file search section 106 and the data base 107 by the method corresponding to the read checking-out item. In this case, the musical-piece management section 104 reads a file (program) describing a content reading procedure from an automatic-checking-out-item storage section 112, and executes reading according to the procedure described in the file.

In response to a request from the musical-piece management section 104, the file search section 106 searches for the file (which stores the content) having the file name obtained from the data base 107, in the musical-piece-file storage section 108-1 or 108-2. The file search section 106 sends the file read from the musical-piece-file storage section 108-1 or 108-2, to the musical-piece management section 104, or changes the file name and sends the file having the changed file name to the musical-piece management section 104.

The musical-piece management section 104 sends the file which stores the content, sent from the file search section 106, to the content management processing section 102 or to the transfer processing section 103.

The data base 107 records data related to contents, such as the IDs of musical pieces, the names of the musical pieces, file names, and other attributes. The data base 107 is stored in the HDD 21.

Figure 4:
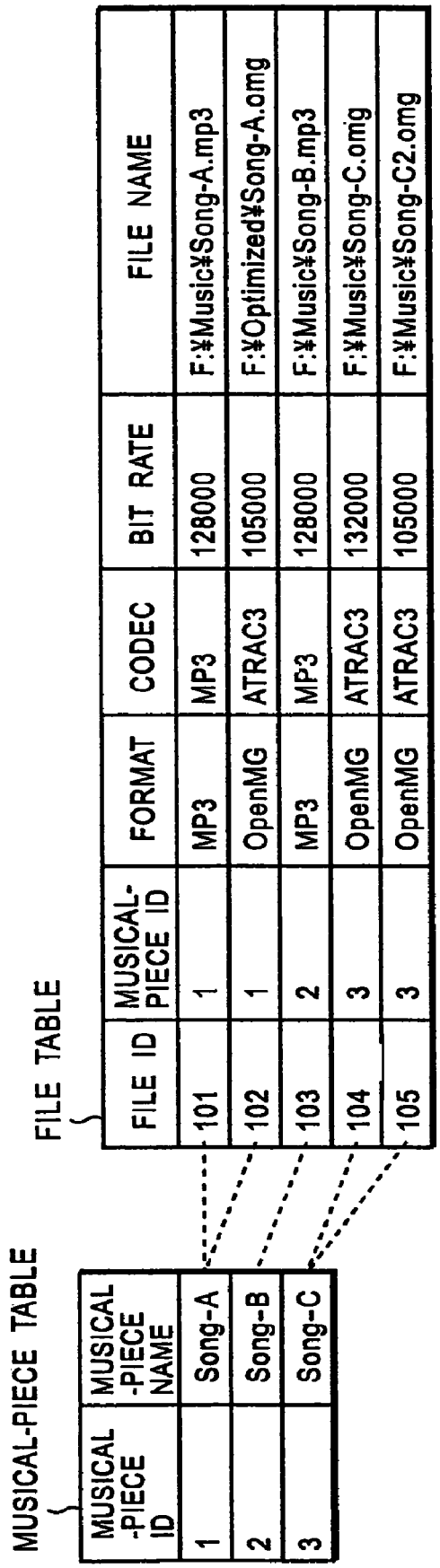
FIG. 4 is a view showing example data recorded in a data base shown in FIG. 3.

FIG. 4 is a view showing example data recorded in the data base 107. The data base 107 is, for example, a relational data base, and manages data corresponding to contents by a musical-piece table and a file table.

For example, the musical-piece table is formed of records each having a musical-piece-ID item and a musical-piece-name item, and stores one musical-piece name correspondingly to one musical-piece ID. One musical-piece ID uniquely corresponds to one musical piece.

In the example shown in FIG. 4, the musical-piece table records a musical-piece name of Song-A correspondingly to a musical-piece ID of one, a musical-piece name of Song-B correspondingly to a musical-piece ID of two, and a musical-piece name of Song-C correspondingly to a musical-piece ID of three.

For example, the file table is formed of records each having a file-ID item, a musical-piece-ID item, a format item, a codec item, a bit-rate item, and a file-name item, and stores a musical-piece ID, a format, a codec, a bit rate, and a file name correspondingly to one file ID. Two or more file IDs may correspond to the same musical-piece ID.

One file ID uniquely corresponds to one file. The format indicates a file format. The codec indicates the encoding method of the content stored in the file. The bit rate indicates the amount of data per unit time (for example, one second) of the content. The file name indicates, for example, a file name which includes a path formed of a drive name and a folder name.

In the example shown in FIG. 4, the file table stores a musical-piece ID of one, a format of MP3, a codec of MP3, a bit rate of 128,000, and a file name of F:\Music\Song-A.mp3 correspondingly to a file ID of 101; and a musical-piece ID of one, a format of OpenMG, a codec of ATRAC3, a bit rate of 105,000, and a file name of F:\Optimized\Song-A.omg correspondingly to a file ID of 102. In the example shown in FIG. 4, the file table also stores a musical-piece ID of two, a format of MP3, a codec of MP3, a bit rate of 128,000, and a file name of F:\Music\Song-B.mp3 correspondingly to a file ID of 103.

In the example shown in FIG. 4, the file table further stores a musical-piece ID of three, a format of OpenMG, a codec of ATRAC3, a bit rate of 132,000, and a file name of F:\Music\Song-C.omg correspondingly to a file ID of 104; and a musical-piece ID of three, a format of OpenMG, a codec of ATRAC3, a bit rate of 105,000, and a file name of F:\Music\Song-C2.omg correspondingly to a file ID of 105.

The musical-piece file storage section 108-1 is formed, for example, of the HDD 21 or an external storage apparatus not shown, such as a removable disk apparatus, and stores contents as files. The contents recorded in the musical-piece-file storage section 108-1 may have right information or have no right information. The musical-piece-file storage section 108-1 can store one or more files for one musical piece. The musical-piece-file storage section 108-1 corresponds, for example, to one drive letter. The drive letter corresponding to the musical-piece-file storage section 108-1 may be changed.

The musical-piece file storage section 108-2 is formed, for example, of the HDD 21 or an external storage apparatus not shown, such as a removable disk apparatus, and stores contents as files. The contents recorded in the musical-piece-file storage section 108-2 may have right information or have no right information. The musical-piece-file storage section 108-2 can store one or more files for one musical piece. The musical-piece-file storage section 108-2 corresponds, for example, to one drive letter. The drive letter corresponding to the musical-piece-file storage section 108-2 may be changed.

There is a case in which one or more files corresponding to one musical piece are recorded in the musical-piece-file storage section 108-1, and one or more files corresponding to the musical piece are recorded in the musical-piece-file storage section 108-2.

Figure 5:
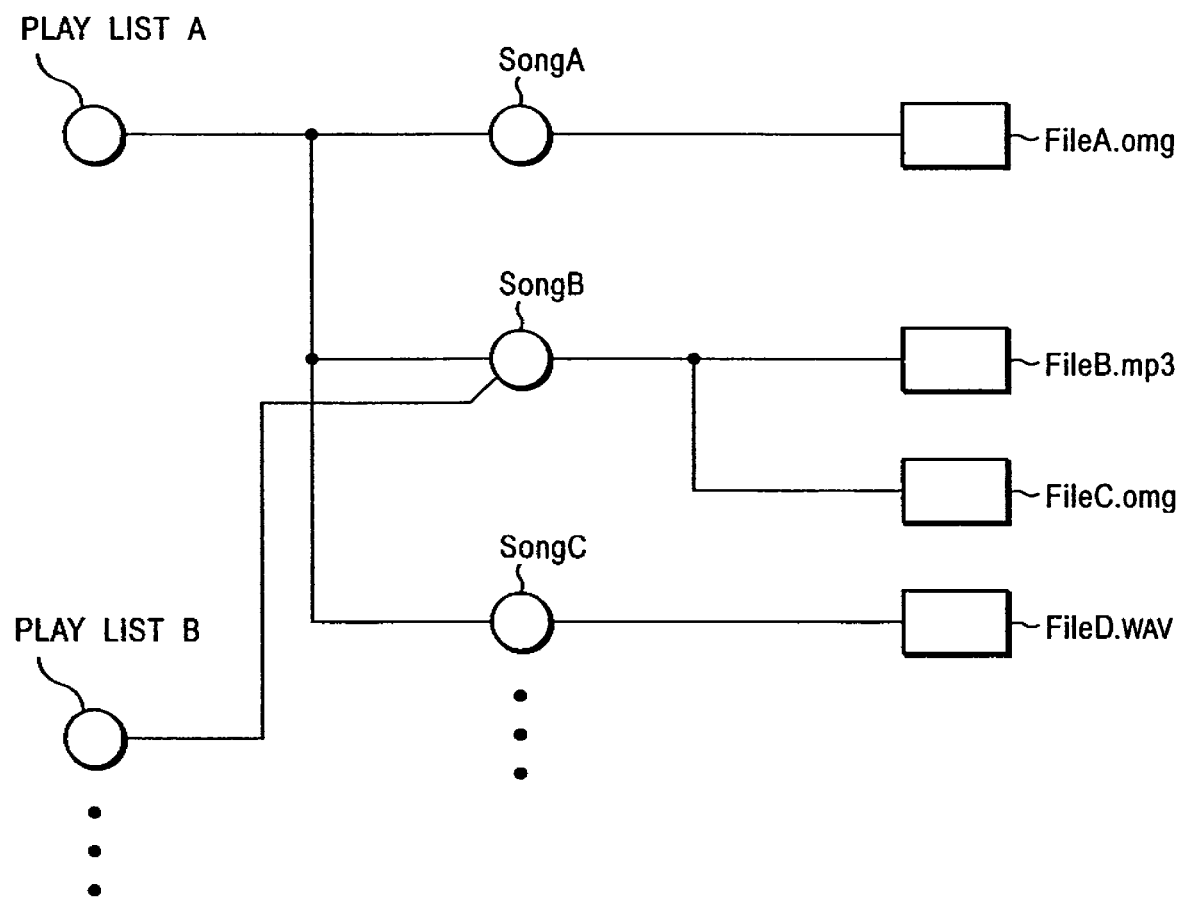
FIG. 5 is a view showing the relationship between musical pieces and files.

FIG. 5 is a view showing the relationship between musical pieces and files. In an example shown in FIG. 5, a musical piece of Song-A belonging to a play list A corresponds to FileA.omg, a musical piece of Song-B belonging to the play list A and to a play list B corresponds to FileB.mp3 and FileC.omg, and a musical piece of Song-C belonging to the play list A corresponds to FileD.wav. A play list is a unit used for classifying musical pieces, and is used for displaying a musical-piece name. No musical piece or one or more musical pieces are associated with a play list.

With this, two or more files having different formats or different encoding methods can be used as one content.

A right-information storage section 105 stores right information corresponding to files conforming to a standard specified by SDMI (Secure Digital Music Initiative), for example, in the HDD 21 and manages it. When the right-information storage section 105 receives a musical-piece ID from the musical-piece management section 104, the right-information storage section 105 searches for one piece of right information corresponding to the musical-piece ID, and sends the searched-for right information to the musical-piece management section 104.

Figure 6:
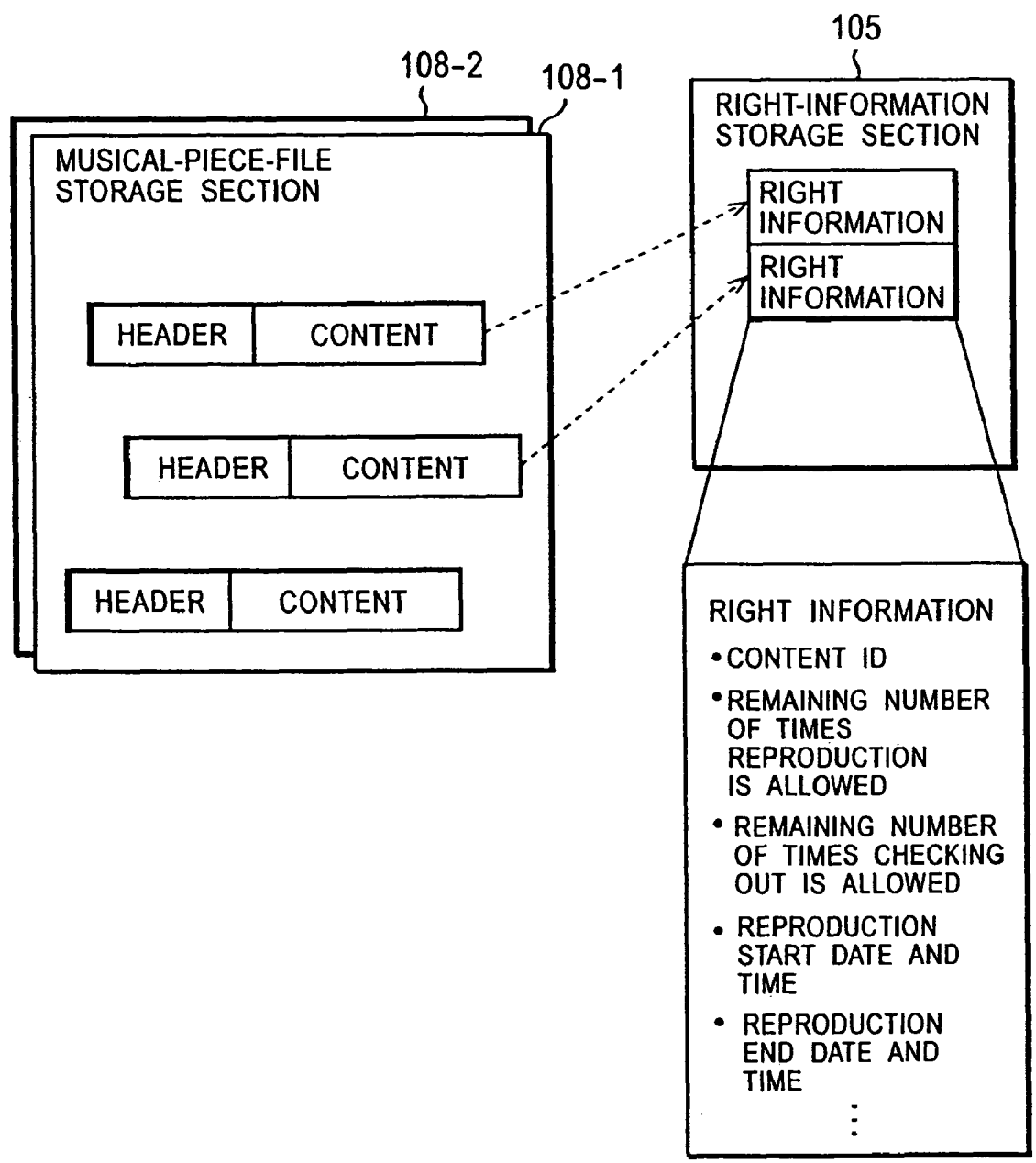
FIG. 6 is a view showing example right information.

FIG. 6 is a view showing example right information stored in the right-information storage section 105. The right information includes, for example, a content ID, the remaining number of times reproduction is allowed, the remaining number of times checking out is allowed, reproduction start date and time, and reproduction end date and time. The right information stored in the right-information storage section 105 corresponds to one file stored in the musical-piece-file storage section 108-1 or 108-2.

A file stored in the musical-piece-file storage section 108-1 or 108-2 includes, for example, a header and a content which is musical-piece data.

A process for encrypting a content, a process for adding right information to the corresponding content, and a process for converting a content encoding method will be described next by referring to FIG. 7.

When a MP3-method content is imported (input to the data base 107), for example, if a first setting (specified by an operation at the GUI section 101 ) has been performed, right information is not generated, and the data corresponding to the content is input to the database 107.

It is determined in response to a subsequent operation whether the MP3-method content imported without generating right information has included a predetermined-method watermark. When it is determined that the MP3-method content has not included a predetermined-method watermark, the MP3-method content is further encrypted and checked out, or an ATRAC3-method content is further generated and encrypted, and the encrypted ATRAC3-method content is stored in the musical-piece-file storage section 108.

When a MP3-method content is imported, for example, if a second setting has been performed, it is determined whether the MP3-method content has included a predetermined-method watermark. When it is determined that the MP3-method content has not included a predetermined-method watermark, the data corresponding to the content is input to the data base 107. Further, the encoding method of the MP3-method content is not changed, and the content remains as unencrypted. Right information corresponding to the MP3-method content is generated. The generated right information is stored in the right-information storage section 105.

In response to a subsequent operation, the imported MP3-method content for which the right information has been generated is further encrypted and checked out, or an ATRAC3-method content is further generated and encrypted, and the encrypted ATRAC3-method content is stored in the musical-piece-file storage section 108.

With such operations, it is not necessary for the content-data management system to record an encrypted content and an unencrypted content both having the same content, and recording areas such as the HDD 21 can be effectively used.

When a MP3-method content is imported, if a third setting has been performed, it is determined whether the MP3-method content has included a predetermined-method watermark. When it is determined that the MP3-method content has not included a predetermined-method watermark, the data corresponding to the content is input to the data base 107. Further, the MP3-method content is converted to have the ATRAC3 method, the generated content is encrypted, and the ATRAC3-method encrypted content is stored in the musical-piece-file storage section 108. Right information corresponding to the ATRAC3-method content is generated, and the generated right information is stored in the right-information storage section 105.

When a content has included a predetermined-method watermark, the content is not input, its encryption method is not changed, the content is not encrypted, and the content is not checked out.

When a content recorded in a CD is ripped, the read content is converted to have the ATRAC3 method and encrypted, and the ATRAC3-method encrypted content is recorded in the musical-piece-file storage section 108. Right information corresponding to the ATRAC3-method content is generated, and the generated right information is stored in the right-information storage section 105.

The above-described importing process, the predetermined process performed after importing, or the ripping process is applied to one or more contents.

The automatic-checking-out-item storage section 112 has stored a definition file indicating an item (method) for checking out a musical-piece file (content) stored in the musical-piece-file storage section 108 when executing the automatic checking-out process. The automatic-checking-out-item storage section 112 refers to the method to execute automatic checking out. The automatic checking-in/checking-out process will be described later in detail.

FIG. 8 shows an example description of a definition file for each checking-out method. Seven checking-out methods are defined, "musical pieces recently listened to," "musical pieces checked out a small number of times," "musical pieces on a favorite play list," "musical pieces selected at random," "a play list selected at random," "specify genre," and "specify play list."

In the definition file of "musical pieces recently listened to," for example, "ObjectSpecId=2" is described at a first row, indicates whether a play list is selected or a musical piece is selected, and also indicates that a play list is selected when the value is one, and a musical piece is selected when the value is two. More specifically, in the current case, it is indicated that the musical-piece-file storage section 108 selects a musical piece.

"FilterPropertySpecId=303" is described at a second row to indicate a property by which a filtering process is applied. In the current case, "303" is displayed as a parameter to indicate that the reproduction date and time are keys for the filtering process. More specifically, the second row indicates that the filtering process is applied to musical-piece files stored in the musical-piece-file storage section 108 by the reproduction date and time.

"Filter=%s>0" is described at a third row to indicate a condition for the filtering process. It is indicated that the value specified in the second-row description, that is, the value of the reproduction date and time, is substituted for "%s."

"SortPropertySpecId=303" is described at a fourth row to indicate a property by which a sort process is applied. In the current case, "303" is displayed as a parameter to indicate that a reference for the sort process is the reproduction date and time. More specifically, the fourth row indicates that the sort process is applied to the musical-piece files stored in the musical-piece-file storage section 108 by the reproduction date and time.

"Asc=−1" is described at a fifth row to indicate whether the sort process shown at the fourth row is performed in the ascending order or in the descending order. In the current case, since the parameter is set to "−1," the descending order is used.

In summary, the definition file of "musical pieces recently listened to" indicates that the musical-piece files are sorted in the descending order of the reproduction date and time.

In the definition file of "musical pieces checked out a small number of times," "ObjectSpecId=2" is described at a first row to indicate whether a play list is selected or a musical piece is selected. In the current case, it is indicated that the musical-piece-file storage section 108 selects a musical piece.

"SortPropertySpecId=1146" is described at a second row to indicate a property by which a sort process is applied. In the current case, the parameter is set to "1146" to indicate that the number of accumulated checking-out times is used as a reference for the sort process. More specifically, the second row indicates that the sort process is applied to the musical-piece files stored in the musical-piece-file storage section 108 by the number of accumulated checking-out times.

"Asc=1" is described at a third row to indicate whether the sort process shown at a fourth row is performed in the ascending order or in the descending order. In the current case, since the parameter is set to "1," the ascending order is indicated.

In summary, the definition file of "musical pieces checked out a small number of times" indicates that the musical-piece files are sorted in the ascending order of the number of accumulated checking-out times.

In the definition file of "musical pieces on a favorite play list," a definition command of "Algorithm" is used and a parameter is set to "favorite" to indicate that musical-piece files belonging to a favorite play list are extracted.

In the definition file of "musical pieces selected at random," a definition command of "Algorithm" is used and a parameter is set to "random" to indicate that musical-piece files are extracted at random.

In the definition file of "musical pieces selected at random," a definition command of "Algorithm" is used and a parameter is set to "randomPlayList" to indicate that a play list is selected at random and the musical-piece files belonging to the selected play list are extracted.

In the definition file of "specify genre," "ObjectSpecId=2" is described at a first row. In this case, it is indicated that the musical-piece-file storage section 108 selects a musical piece.

"FilterPropertySpecId=200" is described at a second row to indicate a property by which a filtering process is applied. In the current case, the parameter is set to "200" to indicate that a genre name is used as a reference for the filtering process. More specifically, the second row indicates that the filtering process is applied to the musical-piece files stored in the musical-piece-file storage section 108 by a genre name.

"Filter=%sLike'%%%1%%'" is described at a third row to show a condition for the filtering process. It is indicated that the value specified in the second-row description in the format defined by "Like'%%%1%%'", that is, a parameter which specifies the genre name, is substituted for "%s."

"SortPropertySpecId=200" is described at a fourth row to indicate a property by which a sort process is applied. In the current case, the parameter is set to "200" to indicate that the genre name is used as a reference for the sort process. More specifically, the fourth row indicates that the sort process is applied to the musical-piece files stored in the musical-piece-file storage section 108 by the genre name.

"Asc=1" is described at a fifth row to indicate whether the sort process shown at the fourth row is performed in an ascending order or in the descending order. In the current case, since the parameter is set to "1," the ascending order is used.

"ParamCount=1" is described at a sixth row to indicate the number of parameters. In the current case, "1" is specified to indicate that the number of parameters is one. "ParamName1=genrename" is described at a seventh row to indicate the display name of the parameter. In the current case, "genrename" is used. "ParamKey1=Genre" is described at an eighth row to indicate the inside name of the parameter. In the current case, it is indicated that the inside name of the parameter is "genre."

In summary, the definition file of "specify genre" indicates that the filtering process is applied with the genre name being used as a parameter and musical-piece files sorted in the ascending order are extracted.

In the definition file of "specify play list", "ObjectSpecId=2" is described at a first row. In the current case, it is indicated that the musical-piece-file storage section 108 selects a musical piece.

"Algorithm=PlayList" is described at a second row. A definition command of "Algorithm" is used and a parameter is set to "PlayList" to indicate that musical-piece files belonging to a predetermined play list are extracted.

"ParamCount=1" is described at a third row to indicate the number of parameters. In the current case, "1" is specified to indicate that the number of parameters is one. "ParamName1=playlistname" is described at a fourth row to indicate the display name of the parameter. In the current case, "playlistname" is used. "ParamKey1=PlayList" is described at a fifth row to indicate the inside name of the parameter. In the current case, it is indicated that the inside name of the parameter is "PlayList."

In summary, the definition file of "specify play list" indicates that the filtering process is applied with the play-list name being used as a parameter and the musical-piece files belonging to the play list are sorted in the ascending order and extracted.

The automatic-checking-out-destination storage section 113 stores for each ID which identifies the corresponding PD 5, a file which defines an automatic checking-out item (method) for each PD 5. When the automatic checking-out process is executed, the file is referred to according to the ID which identifies the corresponding PD 5.

The automatic-checking-out-destination storage section 113 stores for each ID which identifies the corresponding PD 5, checking-out-destination information in a format shown in FIG. 9. More specifically, in this case, a first column records "0101A1346001001479FFFF000012D103" and "B059DE77420406004DC2000009005000" as external-unit/-medium IDs which identify PDs 5, and they identify the corresponding external-unit/medium names, "memory card A" and "memory card B." As "checking-out item-1" of the memory card A identified by an ID of "0101A1346001001479FFFF000012D103", "musical pieces recently listened to" is specified, and nothing is specified as "checking-out item-2". More specifically, in this case, "musical pieces recently listened to" are extracted according to the definition file stored in the automatic-checking-out-item storage section 112, described by referring to FIG. 8, and recorded in the memory card A, identified by an ID of "0101A1346001001479FFFF000012D103."

As "checking-out item-1" of the memory card B identified by an ID of "B059DE77420406004DC2000009005000," "specify genre" is specified, "Blues" is specified as a parameter, "specify play list" is specified as "checking-out item-2", and "My favorites" are specified as a parameter. More specifically, in this case, musical-piece files having a genre of "Blues" and musical-piece files belonging to a play list of "My favorites" are mixed and alternately extracted in the memory card B, identified by an ID of "B059DE77420406004DC2000009005000." A mixing process will be described later in detail.

Figure 10:
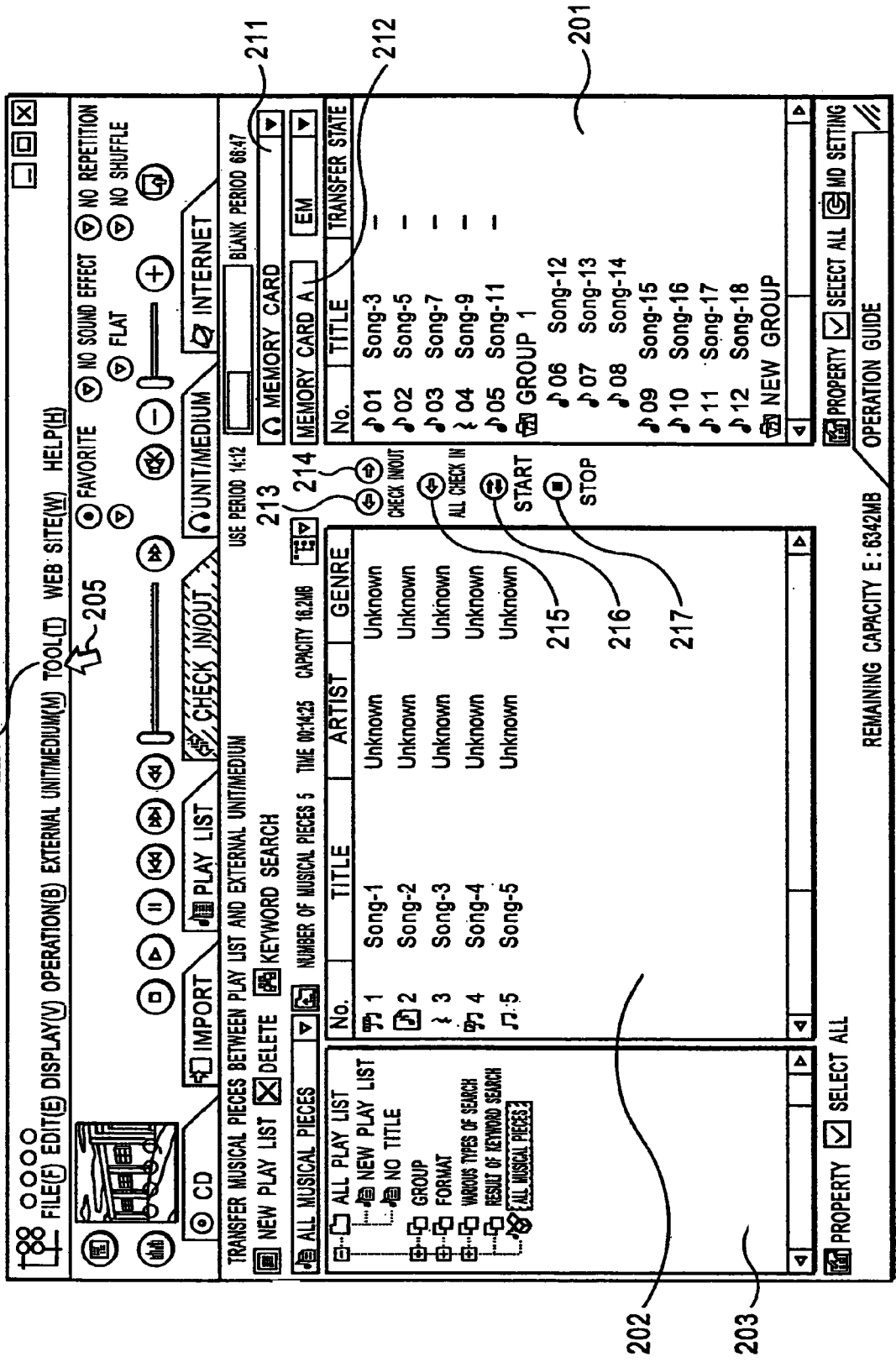
FIG. 10 is a view showing an example screen displayed on a display.

An example screen displayed by the GUI section 101 on the display 20 when contents recorded in each of the personal computer 1 and a PD 5 are mutually checked in or checked out and managed will be described next by referring to FIG. 10.

A PD field 201 displays information of contents recorded in the PD 5. The numbers of tracks where the contents are recorded are displayed at the left-hand side, and the titles of the contents are displayed at the right-hand side. In the current case, the titles of contents are shown as "Song-3" in track number 01, "Song-5" in track number 02, "Song-7" in track number 03, "Song-9" in track number 04, and "Song-11" in track number 05.

Under them, "Group 1" is displayed, and titles are displayed as "Song-12" in track number 06, "Song-13" in track number 07, and "Song-14" in track number 08. It is indicated that "Song-12," "Song-13," and "Song-14," which are the contents in track numbers 06 to 08, belong to a group called Group 1.

Further, under them, "Song-15" to "Song-18" are displayed in track numbers 09 to 12, respectively. Tracks and the corresponding stored contents are indicated.

Above the PD field 201 in the figure, a disk-name indication column is provided. In the current case, "MEMORY CARD A" is indicated as the disk name. Further above, a PD-name indication column 211 is provided. In the current case, "MEMORY CARD" is indicated to show that a memory card is selected as the PD 5. Any portable device currently connected to the personal computer 1 can be selected in the PD-name indication column 211. In the current case, for example, any of the PDs 5-1 to 5-3 can be selected. Information on the contents recorded in the selected PD 5 is displayed in the PD field 201.

At the left-hand side of the PD field 201, a PC (personal computer) field 202 is indicated. The PC field 202 indicates the list of contents corresponding to a filter selected in a filter indication field 203 indicated at the left-hand side of the PC field 202, the contents being stored in the musical-piece-file storage section 107 in the personal computer 1. In the current case, sine "ALL MUSICAL PIECES" is selected in the filter indication field 203, the PC field 202 indicates all contents recorded in the musical-piece-file storage section 107 of the personal computer 1. "Song-1" is indicated at track number 1, "Song-2" at track number 2, "Song-3" at track number 3, "Song-4" at track number 4, and "Song-5" at track number 5. The artist name and genre of each content can also be read from the data base 107 and displayed. In the current case, since they have not been input, "Unknown" is indicated.

Between the PD field 201 and the PC field 202, a check-in button 213, a check-out button 214, an all-check-in button 215, a start button 216, and a stop button 217 are displayed. To specify a content to be checked in to the personal computer 1 among the contents recorded in the PD 5, the user, for example, operates the mouse 19 to press the check-in button 213. Pressing the button specifies the selected content as a content to be checked in. To specify a content to be checked out to the PD 5, the user, for example, operates the mouse 19 to press the check-out button 214. Pressing the button specifies the content to be checked out.

To specify all contents recorded in the PD 5 as contents to be checked in to the personal computer 1, the user, for example, operates the mouse 19 to press the all-check-in button 215. Pressing the button specifies all the contents as contents to be checked out.

When a content to be checked in or a content to be checked out has been specified by the check-in button 213, the check-out button 214, or the all-check-in button 215, the user presses the start button 216 to start checking in or checking out. When the start button 216 was pressed and the checking-in or checking-out process is being executed, the user presses the stop button 217 to stop the process. The user operates, for example, the mouse 19 to move a pointer 205.

Figure 11:
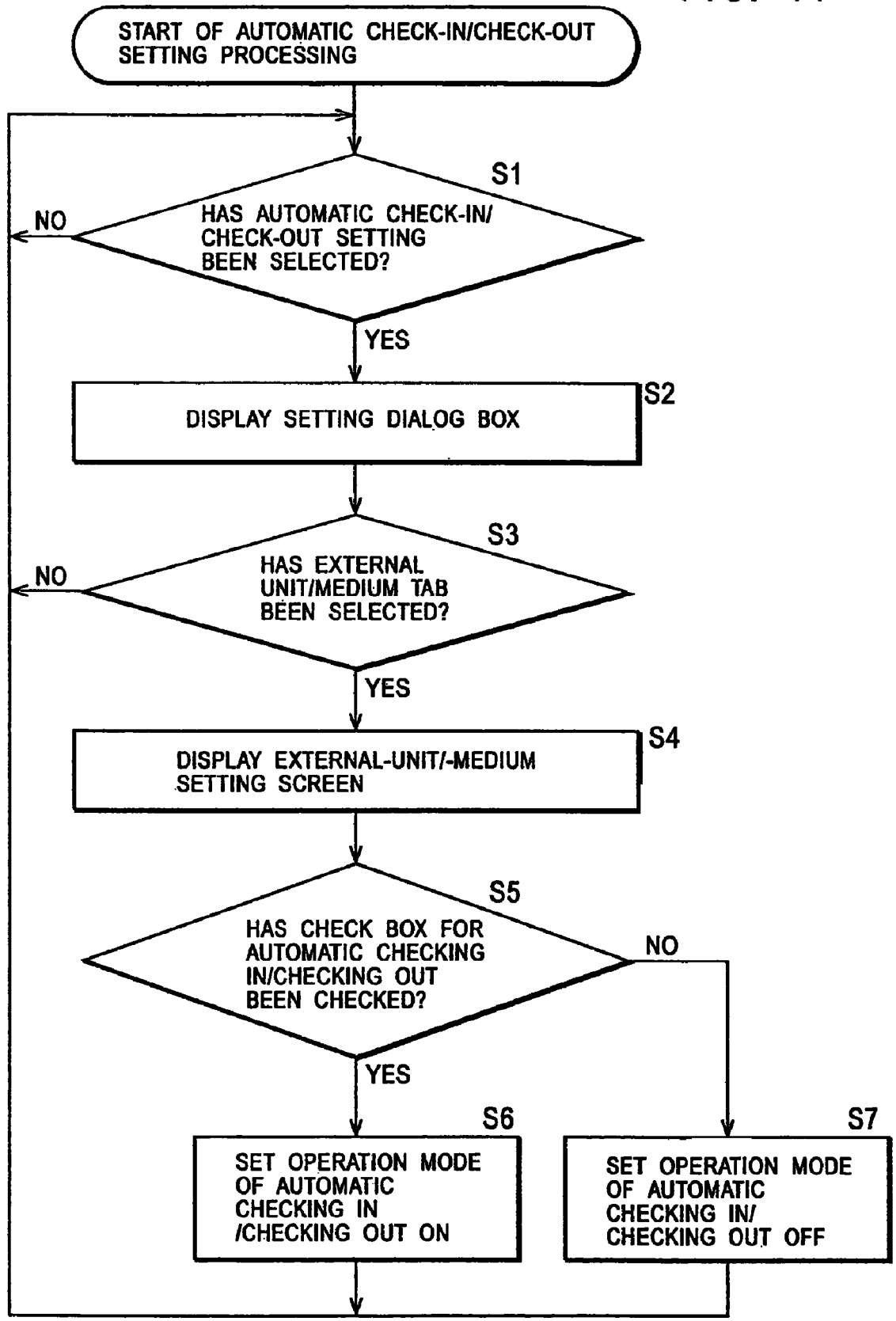
FIG. 11 is a flowchart showing automatic check-in/check-out setting processing.

Automatic check-in/check-out setting processing will be described next by referring to a flowchart shown in FIG. 11.

Figure 12:
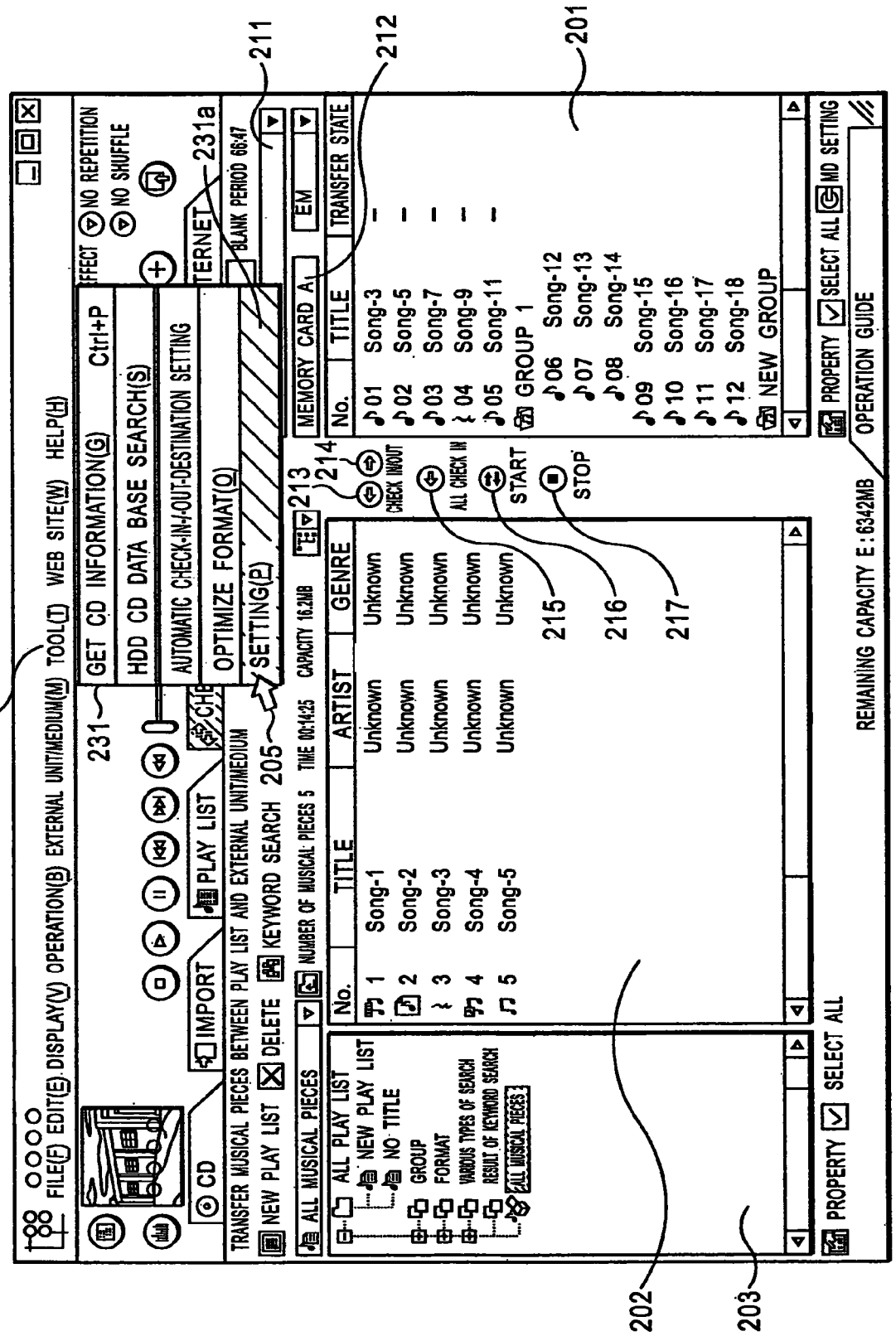
FIG. 12 is a view showing an example screen displayed on the display.

In step S1, the GUI section 101 determines whether automatic check-in/check-out setting has been selected, and repeats the process until the setting is selected. As shown in FIG. 10, for example, it is determined that the setting has been selected when the pointer 205 is moved to a tool button 221 and a predetermined operation is performed (for example, the mouse is clicked); then, a drop down list 231 is displayed as shown in FIG. 12; and further a setting column 23 1a is selected (clicked). The setting processing proceeds to step S2.

Figure 13:
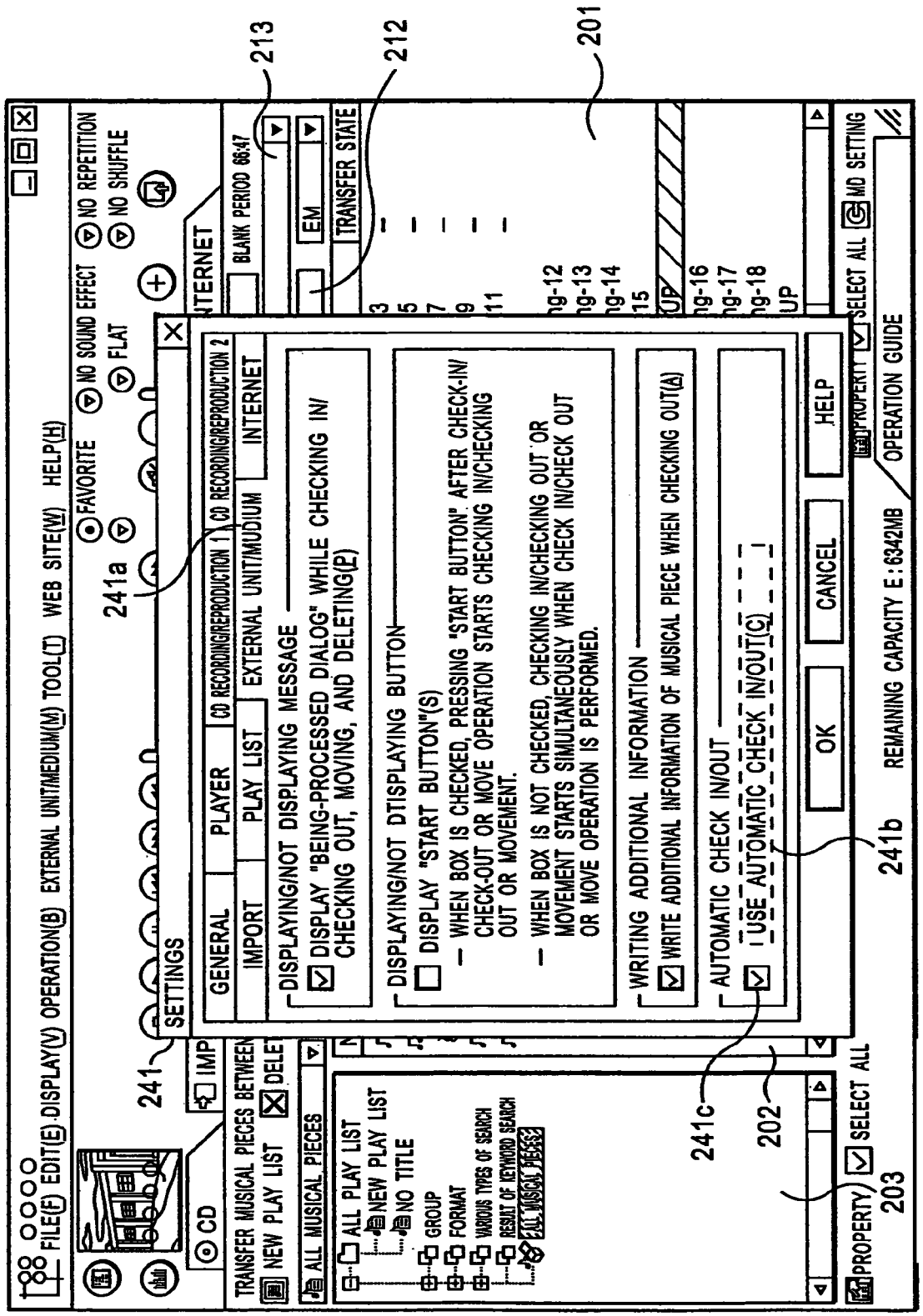
FIG. 13 is a view showing an example screen displayed on the display.

In step S2, the GUI section 101 displays a setting dialog box 241 as shown in FIG. 13. The dialog box 241 includes tabs of "GENERAL", "PLAYER", "CD RECORDING/REPRODUCTION 1", "CD RECORDING/REPRODUCTION 2", "IMPORT", "PLAY LIST", "EXTERNAL UNIT/MEDIUM", and "INTERNET". When a tab is clicked, the dialog box 241 displays another indication.

In step S3, the GUI section 101 determines whether the "EXTERNAL UNIT/MEDIUM" tab has been selected. When it is determined that the external unit/medium tab 241 a has been selected (clicked), for example, the GUI section 101 displays the setting contents of the external unit/medium as shown in FIG. 13. In the dialog box 241, items of "DISPLAYING/NOT DISPLAYING MESSAGE", "DISPLAYING/NOT DISPLAYING BUTTON", "WRITING ADDITIONAL INFORMATION", and "AUTOMATIC CHECK IN/CHECK OUT" are displayed as the setting contents of the external unit/medium, and check boxes for turning on or off the corresponding setting contents are also displayed.

In step S5, the GUI section 101 determines whether the automatic check-in/check-out check box has been checked (for example, whether an OK button has been pressed while the box is checked). When the check box 241c in the automatic check-in/-out column 241b has been checked (the OK button is pressed when the check box 241c has been checked) as shown in FIG. 13, for example, the GUI section 101 sets in step S6 the operation mode of automatic check in/check out ON, and the setting processing returns to step S1. When it is determined in step S3 that the external unit/medium tab 241 a has not been selected, in other words, when another setting tab is selected, or when a cancel button is selected, the setting processing returns to the process of step S1.

When it is determined in step S5 that the check box 241c of the automatic check-in/-out column 241b has not been checked (for example, that the OK button is pressed when the check box 241c is not checked), the GUI section 101 sets in step S7 the operation mode of automatic check in/check out OFF, the setting processing returns to step S1, and the subsequent processes are repeated.

Figure 14:
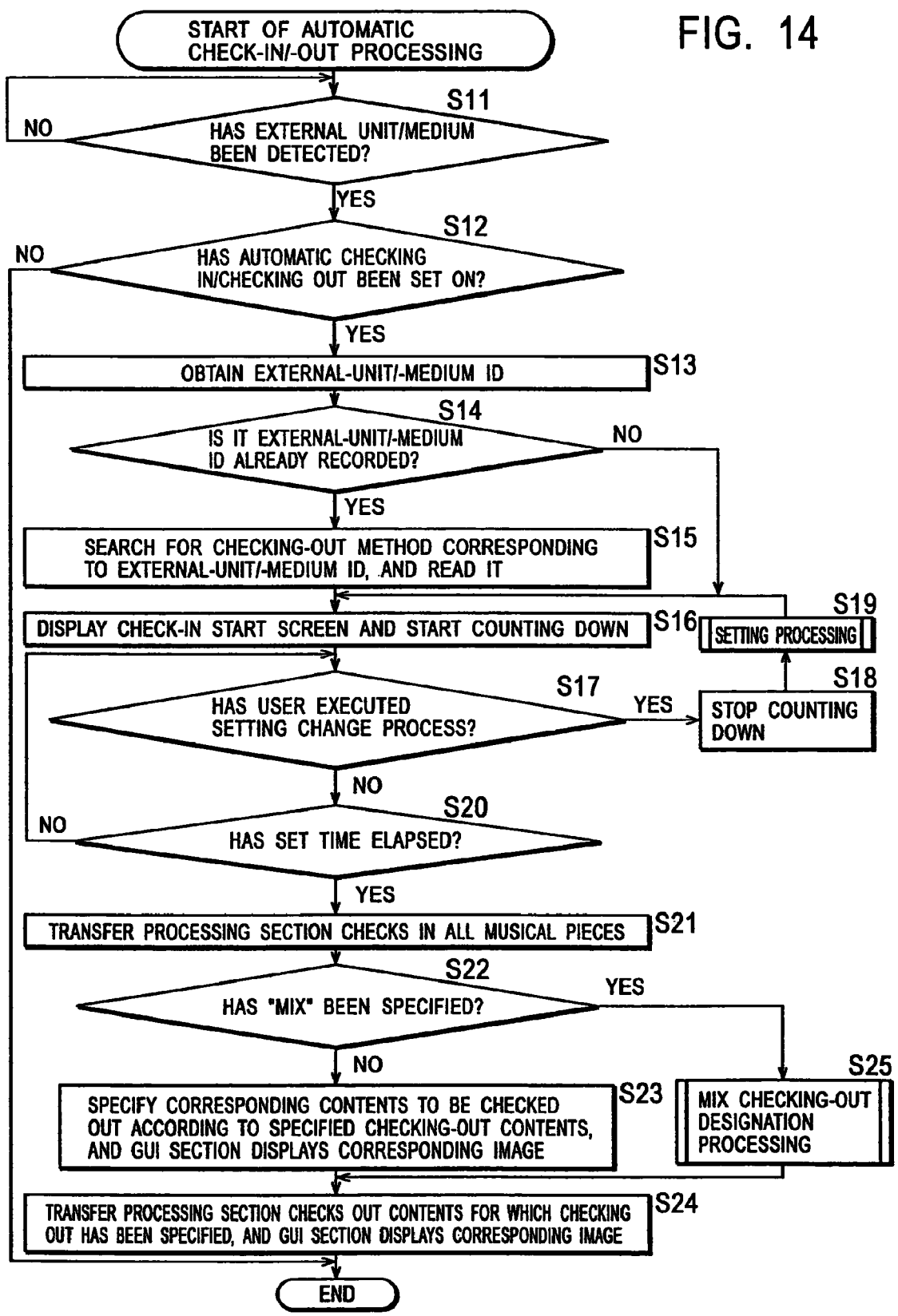
FIG. 14 is a flowchart showing automatic check-in/check-out processing.

Automatic check-in/-out processing executed by the personal computer 1 when the PD 5 is connected to the personal computer 1 will be described next by referring to FIG. 14.

In step S11, the GUI section 101 determines through the transfer processing section 103 and the PD plug-in 111 whether a connection to the PD 5 (external unit/medium) has been detected, and repeats the process until the connection to the PD 5 is detected. When the connection to the PD 5 is detected, and it is determined that an external unit/medium has been detected, for example, the processing proceeds to step S12.

In step S12, the GUI section 101 determines whether automatic check in/check out has been turned on. When the operation mode of automatic check in/check out has been set on in the automatic check-in/check-out setting processing, described by referring to the flowchart of FIG. 11, for example, the automatic check-in/check-out processing proceeds to step S13.

In step S13, the GUI section 101 obtains the external-unit/-medium ID of the PD 5 through the transfer processing section 103 and the PD plug-in 111.

In step S14, the GUI section 101 makes the musical-piece management section 104 refer to the automatic-checking-out-destination storage section 113 according to the obtained external-unit/-medium ID to determine whether the PD 5 is an external unit/medium already recorded (for which it has been recorded that the check out/check in processing was executed in the past). For example, when it is determined that the PD 5 is an external unit/medium already recorded, in other words, when the PD 5 is an external unit/medium for which checking out or checking in was performed in the past, the processing proceeds to step S15.

In step S15, the GUI section 101 makes the musical-piece management section 104 refer to the automatic-checking-out-destination storage section 113 to search for a checking-out method corresponding to the external-unit/-medium ID and to read it.

Figure 15:
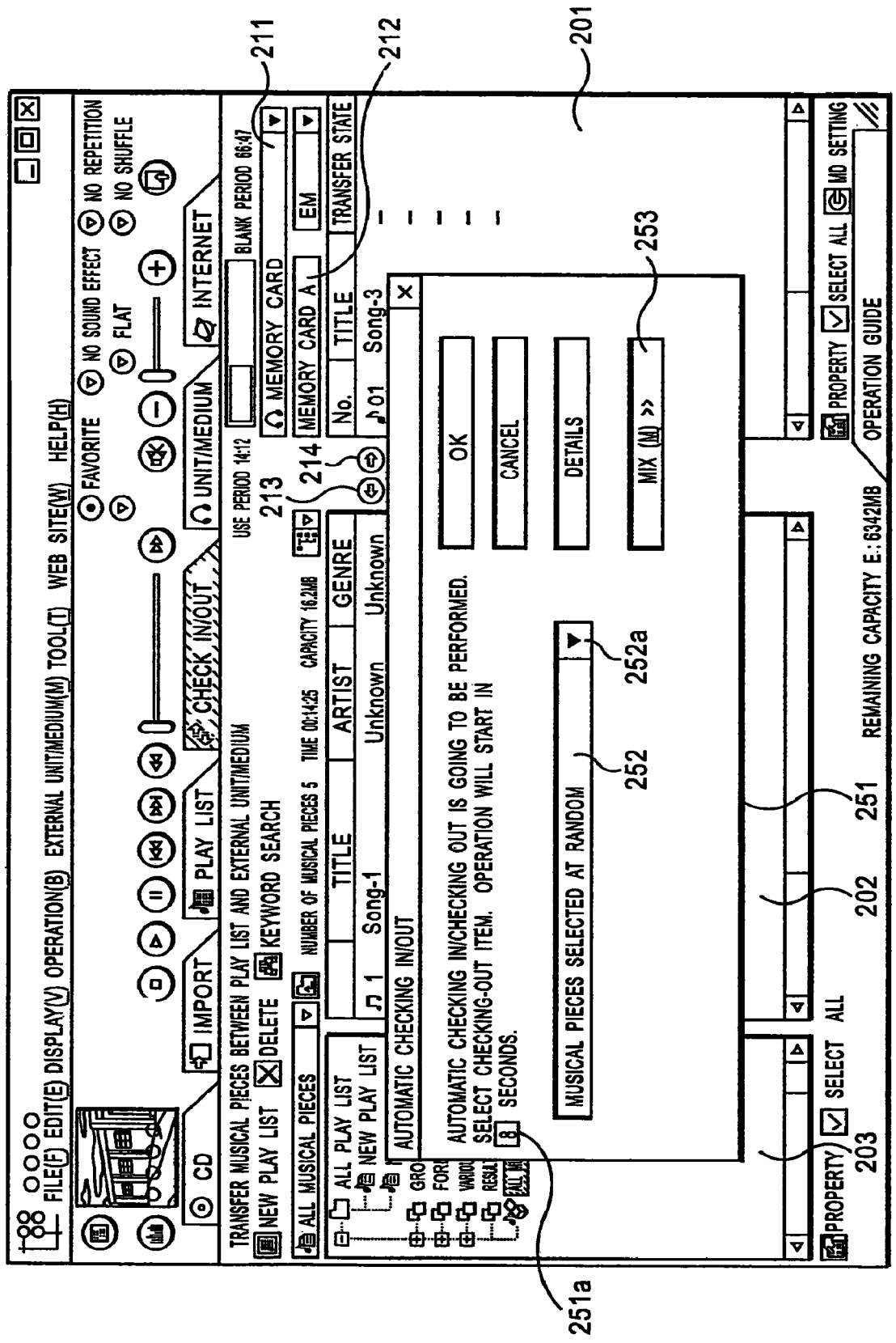
FIG. 15 is a view showing an example screen displayed on the display.

In step S16, the GUI section 101 displays a dialog box 251 of automatic check in/check out, as shown in FIG. 15, and indicates a count-down time in a count-down display section 251a. More specifically, in the case of FIG. 15, the dialog box 251 shows "AUTOMATIC CHECK IN/CHECK OUT IS GOING TO BE PERFORMED. SELECT CHECKING-OUT ITEM. OPERATION WILL START IN 8 SECONDS." A checking-out-item display column 252a shows the automatic-checking-out item corresponding to the external-unit/-medium ID of the PD 5, stored in the automatic-check-out-destination storage section 113. In the current case, the check-out-item display column 252 shows "MUSICAL PIECES SELECTED AT RANDOM" to indicate that the automatic-check-out item stored in the automatic-checking-out-item storage section 112 is "musical pieces selected at random."

Figure 16:
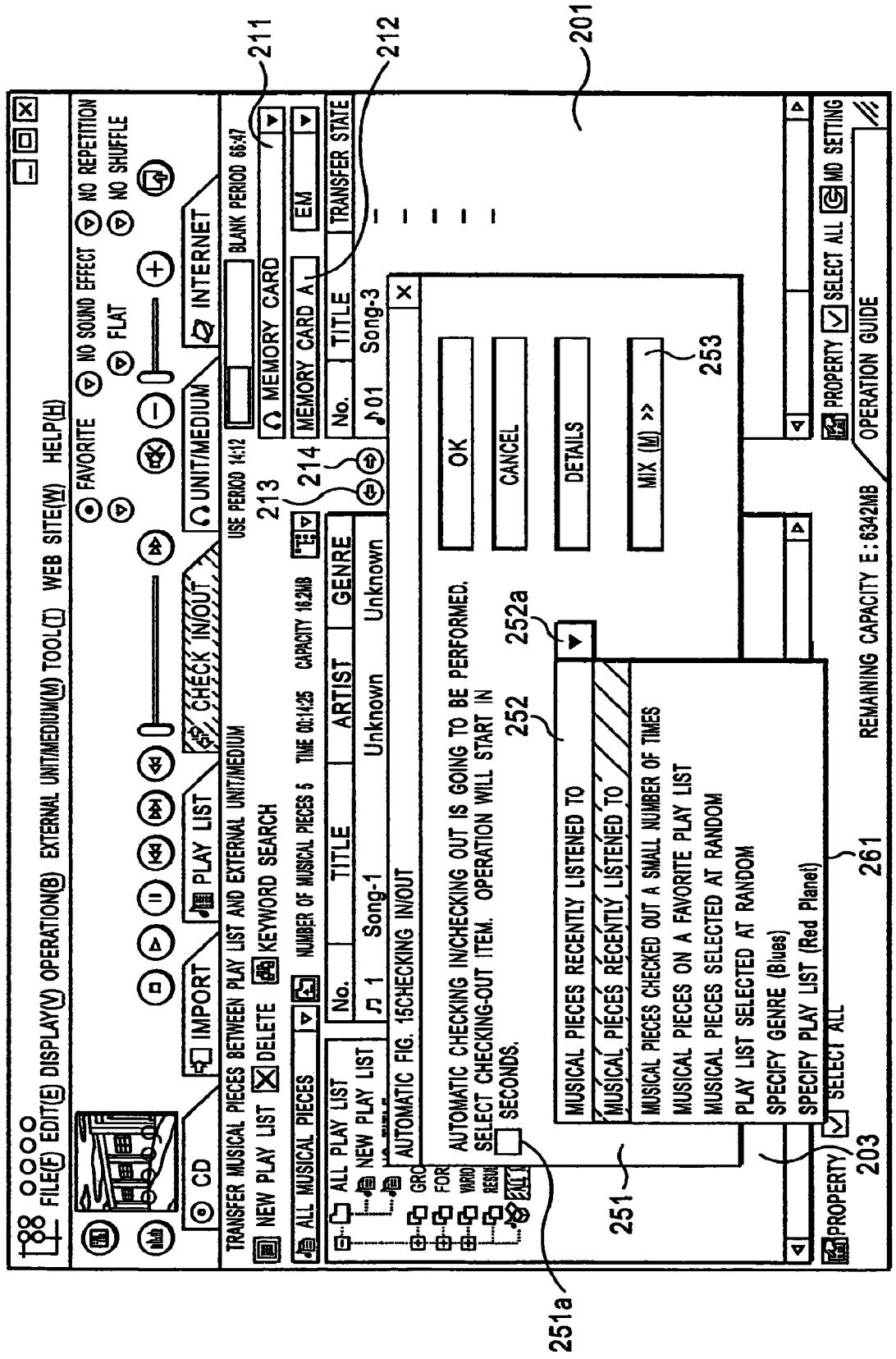
FIG. 16 is a view showing an example screen displayed on the display.

In step S17, the GUI section 101 determines whether the user has executed a setting change process. When the user operates the mouse 19 to press by the pointer 205 a button 252a disposed at the right-hand side of the checking-out-item display column 252 shown in FIG. 15, for example, a drop down list 261 is displayed below the checking-out-item display column 252, as shown in FIG. 16. The drop down list 261 shows as selectable check-out items, "MUSICAL PIECES RECENTLY LISTENED TO", "MUSICAL PIECES CHECKED OUT A SMALL NUMBER OF TIMES", "MUSICAL PIECES ON A FAVORITE PLAY LIST", "MUSICAL PIECES SELECTED AT RANDOM", "PLAY LIST SELECTED AT RANDOM", "SPECIFY GENRE (Blues)", and "SPECIFY PLAY LIST (Red Planet)". The user can operate the pointer 205 to select one of them. At this state, the GUI section 101 determines that the user has executed the setting change process, and the processing proceeds to step S18.

In step S18, the GUI section 101 stops counting down. More specifically, as shown in FIG. 16, the count-down time is not displayed in the count-down display section 251a.

In step S19, the GUI section 101 controls a screen to be displayed on the display 20 to execute setting processing.

Figure 17:
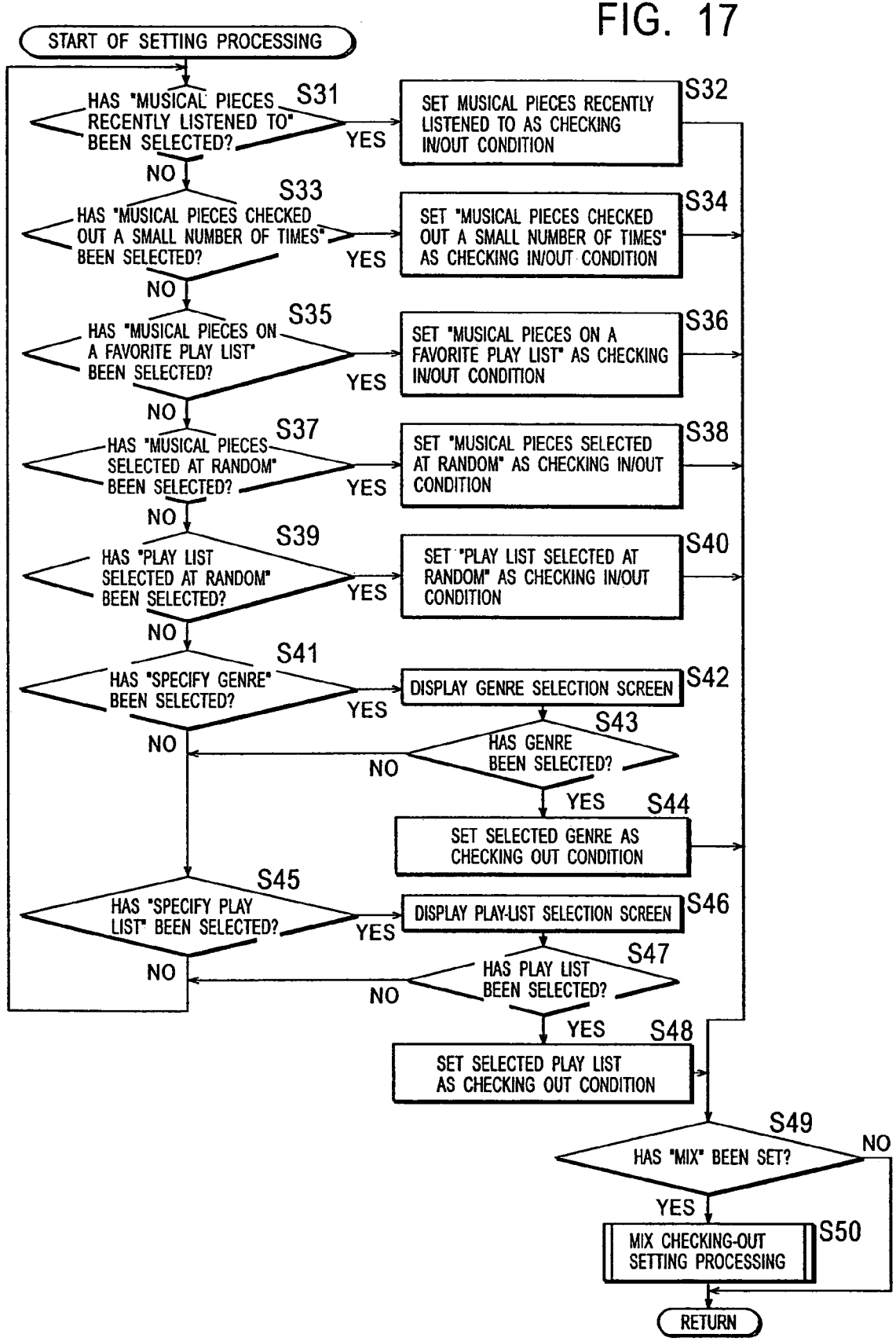
FIG. 17 is a flowchart showing setting processing shown in FIG. 14.

The setting processing will be described here by referring to a flowchart shown in FIG. 17.

In step S31, the GUI section 101 determines whether "musical pieces recently listened to" has been selected. When the pointer 205 is moved onto "MUSICAL PIECES RECENTLY LISTENED TO" in the drop down list 261 shown in FIG. 16 and it is selected (clicked), for example, the GUI section 101 determines that "musical pieces recently listened to" has been selected. In step S32, the GUI section 101 makes the musical-piece management section 104 change the checking-out item-1 (shown in FIG. 9) stored in the automatic-checking-out-destination storage section 113 to "musical pieces recently listened to" and the processing proceeds to step S49.

When it is determined in step S31 that "musical pieces recently listened to" has not been selected, the processing proceeds to step S33.

In step S33, the GUI section 101 determines whether "musical pieces checked out a small number of times" has been selected. When the pointer 205 is moved onto "MUSICAL PIECES CHECKED OUT A SMALL NUMBER OF TIMES" in the drop down list 261 shown in FIG. 16 and it is selected (clicked), for example, the GUI section 101 determines that "musical pieces checked out a small number of times" has been selected. In step S34, the GUI section 101 makes the musical-piece management section 104 change the checking-out item-1 (shown in FIG. 9) stored in the automatic-checking-out-destination storage section 113 to "musical pieces checked out a small number of times" and the processing proceeds to step S49.

When it is determined in step S33 that "musical pieces checked out a small number of times" has not been selected, the processing proceeds to step S35.

In step S35, the GUI section 101 determines whether "musical pieces on a favorite play list" has been selected. When the pointer 205 is moved onto "MUSICAL PIECES ON A FAVORITE PLAY LIST" in the drop down list 261 shown in FIG. 16 and it is selected (clicked), for example, the GUI section 101 determines that "musical pieces on a favorite play list" has been selected. In step S36, the GUI section 101 makes the musical-piece management section 104 change the checking-out item-1 (shown in FIG. 9) stored in the automatic-checking-out-destination storage section 113 to "musical pieces on a favorite play list" and the processing proceeds to step S49.

When it is determined in step S35 that "musical pieces on a favorite play list" has not been selected, the processing proceeds to step S37.

In step S37, the GUI section 101 determines whether "musical pieces selected at random" has been selected. When the pointer 205 is moved onto "MUSICAL PIECES SELECTED AT RANDOM" in the drop down list 261 shown in FIG. 16 and it is selected (clicked), for example, the GUI section 101 determines that "musical pieces selected at random" has been selected. In step S38, the GUI section 101 makes the musical-piece management section 104 change the checking-out item-1 (shown in FIG. 9) stored in the automatic-checking-out-destination storage section 113 to "musical pieces selected at random" and the processing proceeds to step S49.

When it is determined in step S37 that "musical pieces selected at random" has not been selected, the processing proceeds to step S39.

In step S39, the GUI section 101 determines whether "a play list selected at random" has been selected. When the pointer 205 is moved onto "PLAY LIST SELECTED AT RANDOM" in the drop down list 261 shown in FIG. 16 and it is selected (clicked), for example, the GUI section 101 determines that "a play list selected at random" has been selected. In step S40, the GUI section 101 makes the musical-piece management section 104 change the checking-out item-1 (shown in FIG. 9) stored in the automatic-checking-out-destination storage section 113 to "a play list selected at random" and the processing proceeds to step S49.

When it is determined in step S39 that "a play list selected at random" has not been selected, the processing proceeds to step S41.

Figure 18:
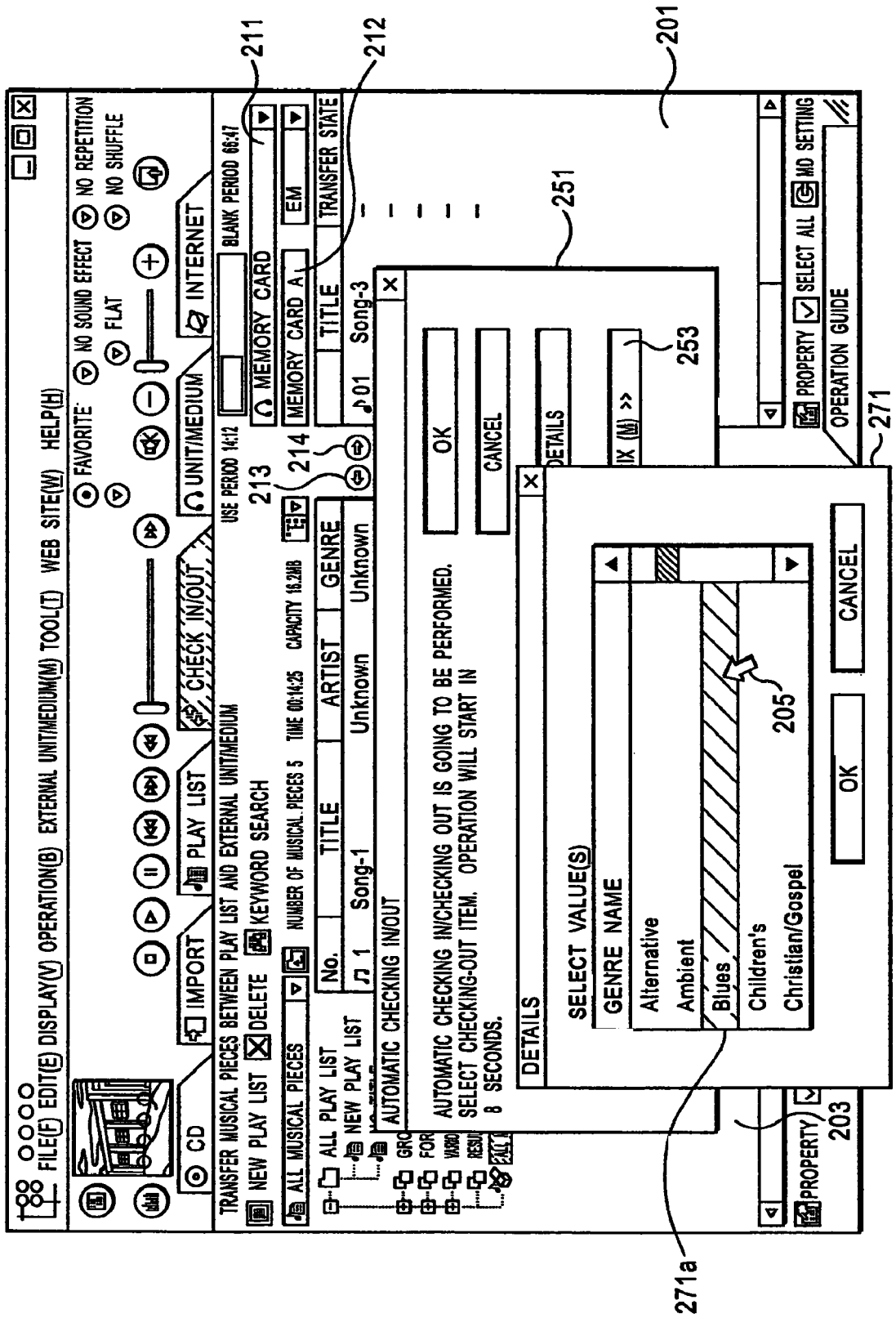
FIG. 18 is a view showing an example screen displayed on the display.

In step S41, the GUI section 101 determines whether "specify genre" has been selected. When the pointer 205 is moved onto "SPECIFY GENRE" in the drop down list 261 shown in FIG. 16 and it is selected (clicked), for example, the GUI section 101 determines that "specify genre" has been selected. In step S42, the GUI section 101 displays a dialog box 271 indicating details of the genre, as shown in FIG. 18. In the dialog box 271, selectable genre names are indicated in a genre-name selection column 271a. A desired genre can be selected by operating the pointer 205.

In step S43, the GUI section 101 determines whether a genre has been selected. When "Blues" is selected as shown in FIG. 18, for example, the GUI section 101 determines that the genre has been selected, and the processing proceeds to step S44. In step S44, the GUI section 101 makes the musical-piece management section 104 set the checking-out item-1 to "specify genre" and the variable-1 (parameter) to the selected genre name (in the current case, "Blues" is set as the genre name) as the checking-out-destination information to be stored in the automatic-checking-out-destination storage section 113, and the processing proceeds to step S49.

When it is determined in step S41 that "specify genre" has not been selected, or when it is determined in step S43 that a genre has not been selected, the processing proceeds to step S45.

Figure 19:
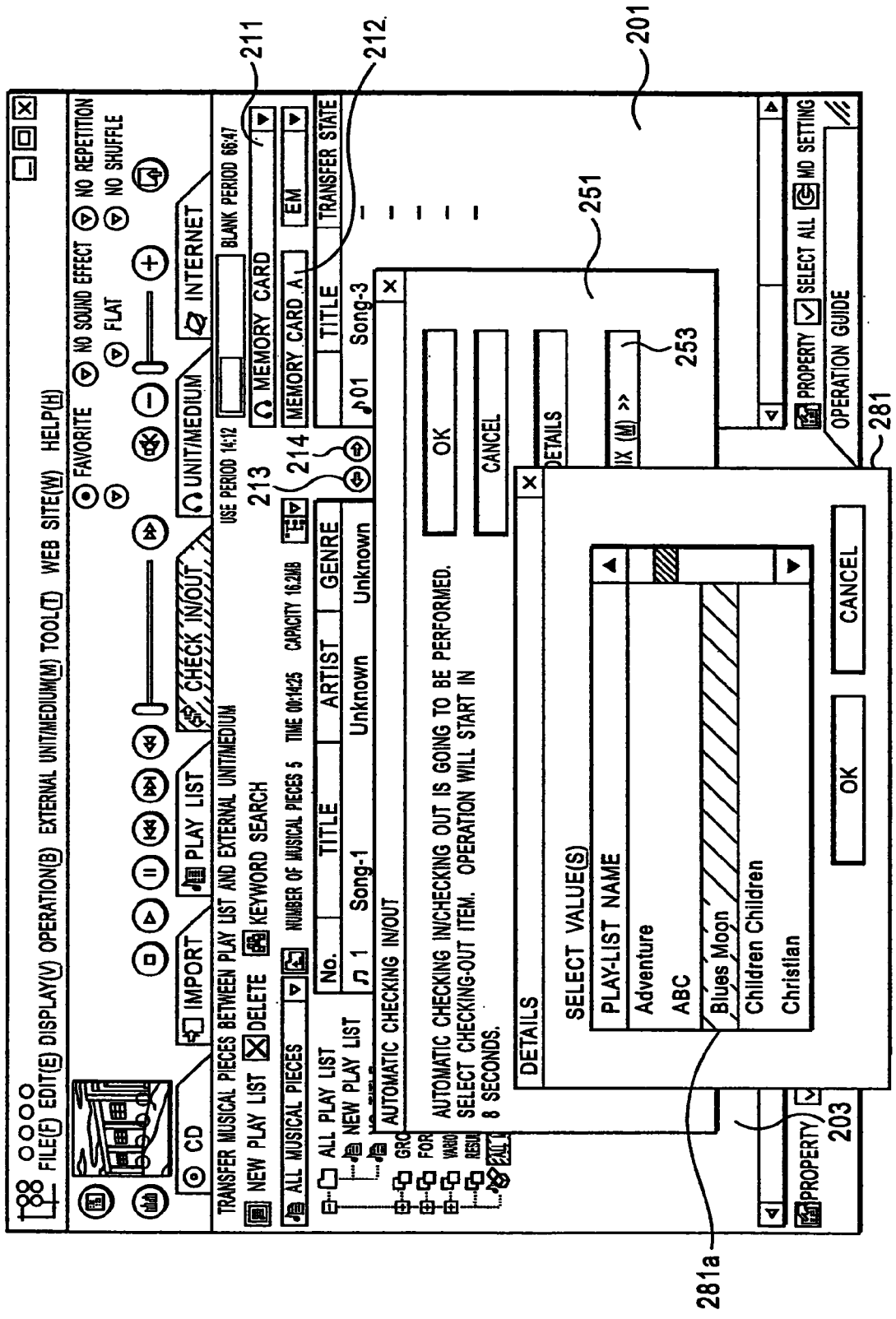
FIG. 19 is a view showing an example screen displayed on the display.

In step S45, the GUI section 101 determines whether "specify play list" has been selected. When the pointer 205 is moved onto "SPECIFY PLAY LIST" in the drop down list 261 shown in FIG. 16 and it is selected (clicked), for example, the GUI section 101 determines that "specify play list" has been selected. In step S46, the GUI section 101 displays a dialog box 281 indicating details of play lists, as shown in FIG. 19. In the dialog box 281, selectable play-list names are indicated in a play-list-name selection column 281a. A desired genre can be selected by operating the pointer 205.

In step S47, the GUI section 101 determines whether a genre has been selected. When "Blue Moon" is selected as shown in FIG. 19, for example, the GUI section 101 determines that the play list has been selected, and the processing proceeds to step S48. In step S48, the GUI section 101 makes the musical-piece management section 104 set the checking-out item-1 to "specify play list" and the variable-1 (parameter) to the selected play list (in the current case, "Blue Moon" is set as the play-list name) as the checking-out-destination information to be stored in the automatic-checking-out-destination storage section 113, and the processing proceeds to step S49.

When it is determined in step S45 that "specify play list" has not been selected, or when it is determined in step S47 that a play list has not been selected, the processing returns to step S31.

Figure 20:
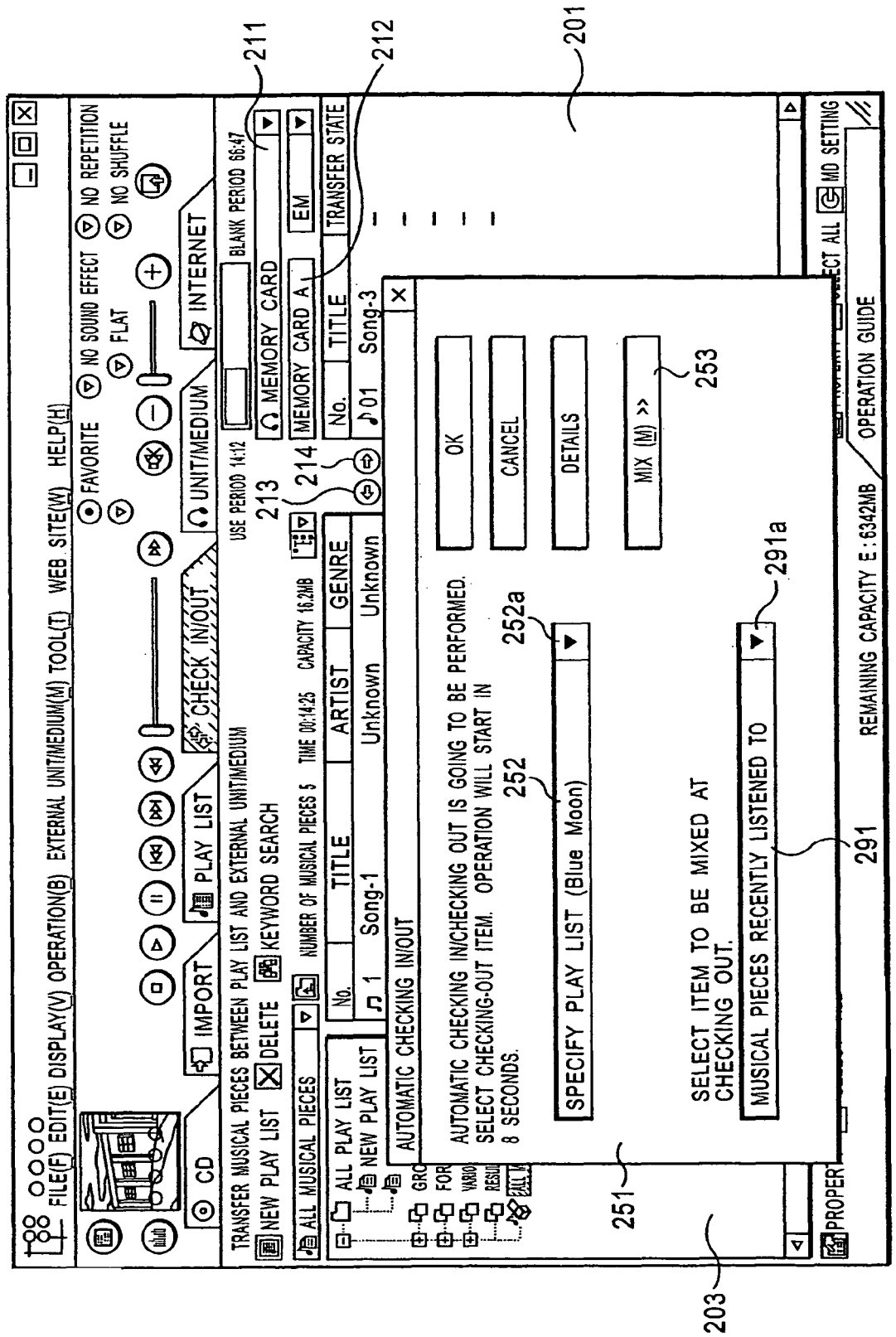
FIG. 20 is a view showing an example screen displayed on the display.

In step S49, the GUI section 101 determines whether "mix" has been selected. When the mix button 253 is pressed by the pointer 205 (the mouse 19 is clicked) in the dialog box 251 as shown in FIG. 15, "SELECT ITEM TO BE MIXED AT CHECKING OUT" is displayed at a lower portion of the dialog box 251, as shown in FIG. 20, and a checking-out item display column 291 is shown at a further lower portion. It is determined at this point of time that "mix" is selected, and the processing proceeds to step S50. In step S50, the GUI section 101 executes mix checking-out setting processing.

Figure 21:
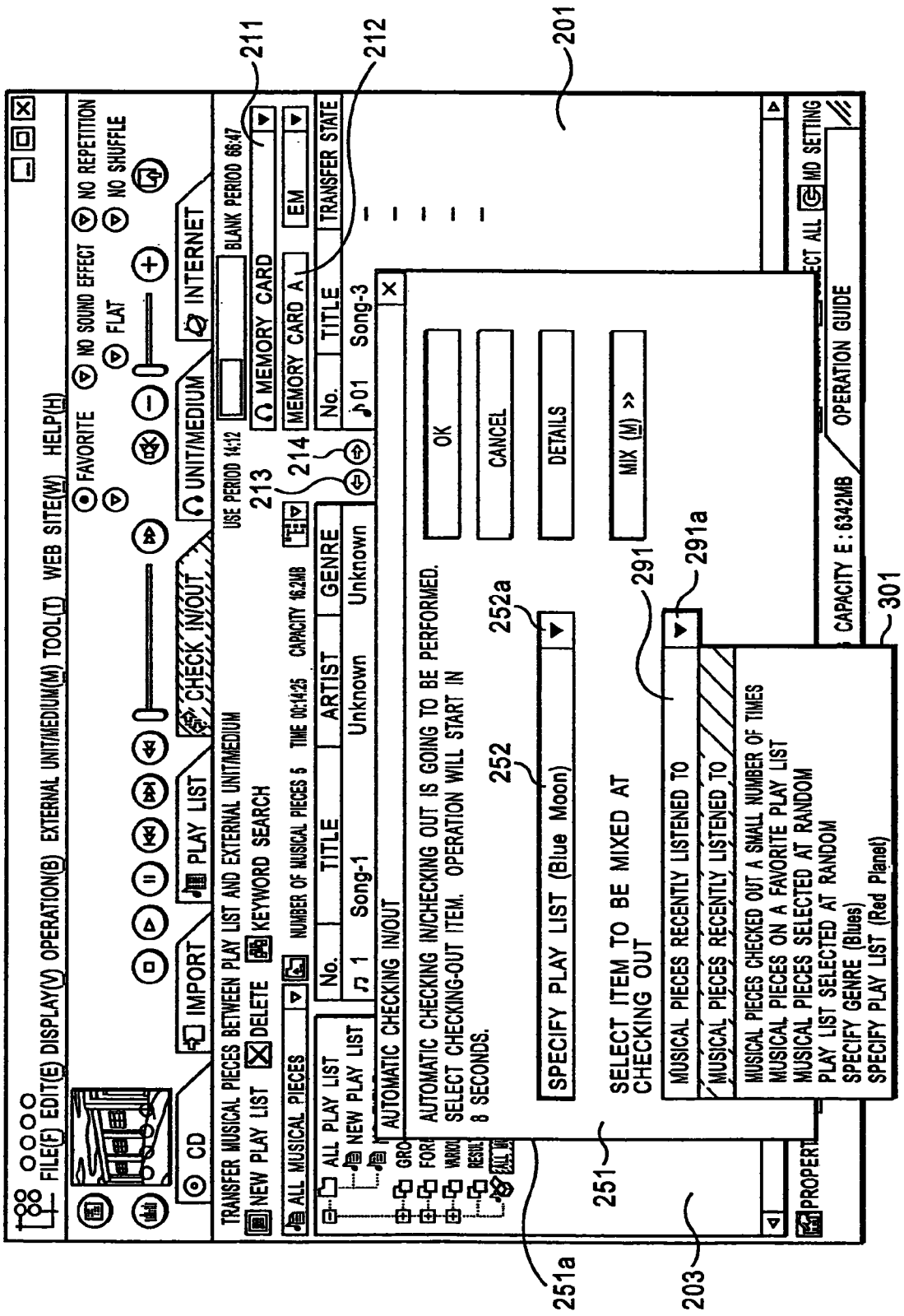
FIG. 21 is a view showing an example screen displayed on the display.

When the pointer 205 is moved onto a button 291a shown in FIG. 20, and the mouse is clicked, the same drop down list 301 as the drop down list 261 (FIG. 16) is displayed, as shown in FIG. 21. In other words, the mix checking-out setting processing changes the checking-out item-2 and the variable-2 among the pieces of information stored in the automatic-checking-out-destination storage section 113, and is substantially the same as the processes of step S31 to step S48 shown in FIG. 17 (the processes which exclude those performed in step S49 and step S50 in the flowchart shown in FIG. 7). Therefore, a description thereof is omitted.

When it is determined in step S49 that "mix" has not been selected, the process of step S50 is skipped and the setting processing is terminated. The processing returns to step S16 (FIG. 14).

The setting processing has been described in a case in which the external-unit/-medium ID has been input. When the PD 5 has an external-unit/-medium ID which is used for the first time and has not been input, the external-unit/-medium ID of the PD 5 is read and the corresponding checking-out item-1 and item-2 are input to the automatic-checking-out-destination storage section 113 in the process of step S32, S34, S36, S38, S40, S44, or S48.

The description of the flowchart shown in FIG. 14 will be started again.

When it is determined in step S17 that the user has not executed the setting change process, the processing proceeds to step S20. In step S20, the GUI section 101 determines whether the set time has elapsed, and returns to step S17 until the set time has elapsed. In other words, the processes of steps S17 and S20 are repeated until the set time has elapsed by counting down. When it is determined in step S20 that the set time has elapsed, that is, counting down has finished, the processing proceeds to step S21. In step S21, the transfer processing section 103 checks in all musical-piece files (contents) recorded in the PD 5 into the personal computer 1.

In step S22, the GUI section 101 inquires of the musical-piece management section 104 whether "mix" has been specified in the checking-out item stored in the automatic-checking-out-destination storage section 113. When it is determined the "mix" has not been specified, the processing proceeds to step S23.

Figure 22:
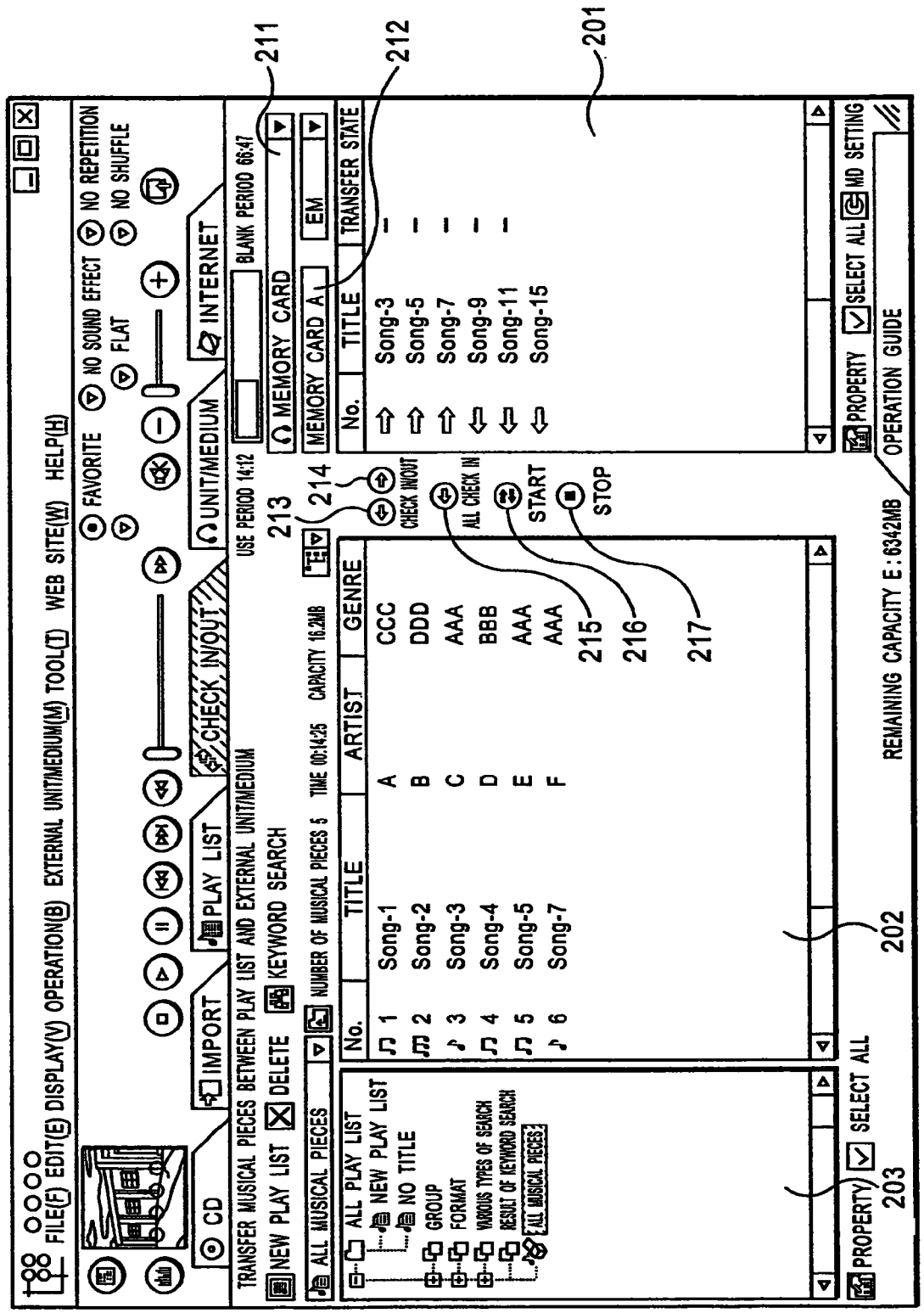
FIG. 22 is a view showing an example screen displayed on the display.

In step S23, the GUI section 101 makes the musical-piece management section 104 read a definition file corresponding to the specified checking-out item from the automatic-checking-out-item storage section 112, specifies according to the definition file the corresponding content to be checked out, and displays the corresponding image. More specifically, for example, when "select genre" is specified as a checking-out item, and musical-piece files (contents) corresponding to a genre name of "AAA" are to be checked out to the PD 5, "Song-3", "Song-5", and "Song-7" having a genre of "AAA" are specified as checking-out contents among the contents displayed in the PC field 202, right-pointing arrows are displayed at the left-hand side of the titles in the PD field 201 to indicate these checking-out contents, and left-pointing arrows are displayed at the left-hand side of the titles for the other contents to be checked in, as shown in FIG. 22. In this way the contents (musical-piece files) to be checked out and the contents (musical-piece files) to be checked in are displayed.

Figure 23:
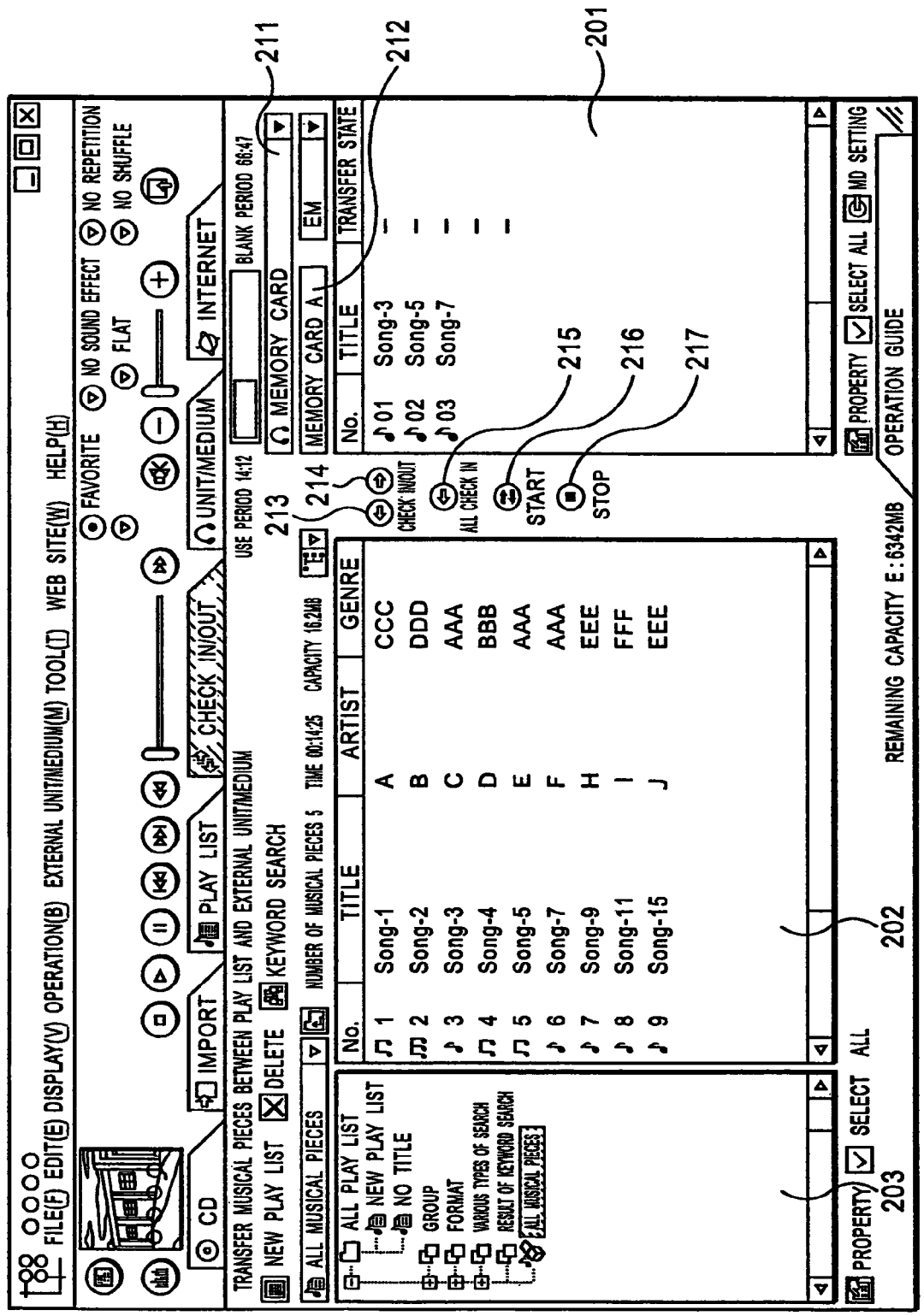
FIG. 23 is a view showing an example screen displayed on the display.

In step S24, the transfer processing section 24 reads the corresponding files to check out the musical-piece files for which checking out has been specified, and the GUI section 101 displays the corresponding image on the display 20. More specifically, when checking out has been specified as shown in FIG. 22, the process of step S24 displays the musical-piece files for which checking out has been specified, "Song-3", "Song-5", and "Song-7", in the PD field 201, and checks in the other musical-piece files, "Song-9", "Song-11", and "Song-15" from the PD 5 to the personal computer 1, as shown in FIG. 23.

When it is determined in step S22 that "mix" has been specified, the processing proceeds to step S25. In step S25, the GUI section 101 executes mix checking-out designation processing.

Figure 24:
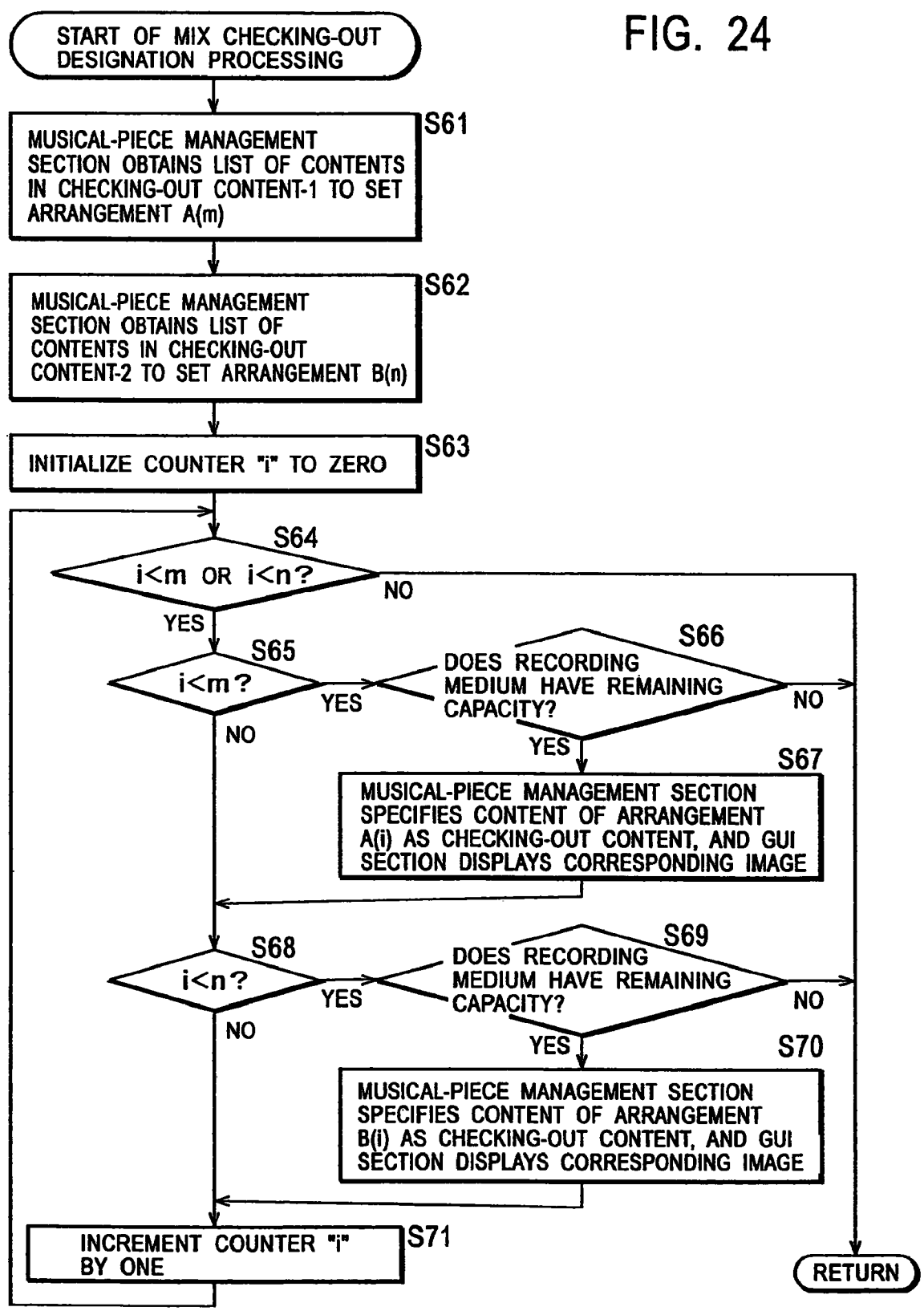
FIG. 24 is a flowchart showing mix checking-out processing.

The mix checking-out processing will be described below by referring to a flowchart shown in FIG. 24.

In step S61, the musical-piece management section 104 obtains the list of contents corresponding to the checking-out item-1, stored in the automatic-checking-out-destination storage section 113, and sets an arrangement A(m) according to the list.

In step S62, the musical-piece management section 104 obtains the list of contents corresponding to the checking-out item-2, stored in the automatic-checking-out-destination storage section 113, and sets an arrangement B(n) according to the list.

In step S63, the musical-piece management section 104 initializes a counter "i" to zero. In step S64, the musical-piece management section 104 determines whether i<m or i<n, that is, whether the counter "i" is smaller than either of the numbers of contents in the arrangements A(m) and B(n) defined by the checking-out item-1 and item-2. When it is determined that i<m or i<n, the processing proceeds to step S65.

In step S65, it is determined whether i<m. When it is determined that i<m, the musical-piece management section 104 determines through the transfer processing section 103 and the PD plug-in 111 whether the PD 5 (recording medium) has a remaining capacity (capacity with which the content defined by A(i) can be checked out) in step S66. When it is determined in step S66 that the PD 5 has a remaining capacity, the musical-piece management section 104 specifies the musical-piece file (content) corresponding to the arrangement A(i) as a checking-out content, and the GUI section 101 displays the corresponding image on the display 20 in step S67. Then, the processing proceeds to step S68.

In step S68, it is determined whether i<n. When it is determined that i<n, the musical-piece management section 104 determines through the transfer processing section 103 and the PD plug-in 111 whether the PD 5 (recording medium) has a remaining capacity in step S69. When it is determined in step S69 that the PD 5 has a remaining capacity, the musical-piece management section 014 specifies the musical-piece file (content) corresponding to the arrangement B(i) as a checking-out content, and the GUI section 101 displays the corresponding image on the display 20 in step S70. Then, the processing proceeds to step S71.

In step S71, the musical-piece management section 104 increments the counter "i" by one to set i=i+1, and the processing proceeds to step S64.

When it is determined in step S64 that i≧m and i≧n, in other words, it is deemed that there is no content (musical-piece file) specified by the checking-out item-1 and item-2, the processing is terminated.

When it is determined in step S66 or in step S69 that the PD 5 (recording medium) has no remaining capacity, it is deemed that a musical-piece file (content) cannot be recorded any more, and the processing is terminated.

In summary, with the above processes, the contents specified in the arrangements of the checking-out item-1 and item-2 are alternately specified as a checking-out item in steps S67 and S70, and when there is no content to be specified as a checking-out item (i≧m and i≧n in step S64), or when it is determined that the recording medium has no remaining capacity (when it is determined in step S66 or S69 that the recording medium has no remaining capacity), the content checking-out designation processing is terminated.

The description of the flowchart shown in FIG. 14 will be started again.

When it is determined in step S12 that automatic checking in/out has not been set on, since the automatic checking-in processing is not executed, the processes of step S13 to step S24 are all skipped, and the processing is terminated.

When it is determined in step S14 that it is not an external-unit/-medium ID recorded in advance, since the information of the checking-out item corresponding to the external unit/medium has not been stored in the automatic-checking-out-destination storage section 113, the process of step S5, in which the checking-out item corresponding to the external-unit/-medium ID is searched for, is skipped.

According to the above description, just when the PD 5 is connected to the personal computer 1, contents recorded in the PD 5 are checked in to the personal computer 1, and a predetermined content is checked out from the personal computer 1 to the PD 5, according to a checking-out item specified in advance. Therefore, when new musical pieces are downloaded to the personal computer 1 everyday, for example, if a setting is made such that a predetermined genre is checked out, only a musical piece belonging to the specified genre is checked out to the PD 5 among the musical pieces downloaded everyday. Consequently, the user can enjoy a new musical piece in a favorite genre everyday just by connecting the PD 5 to the personal computer 1.

In the above description, a case has been explained in which the automatic-checking-in/-out-destination setting processing is executed at timing when the automatic checking-in/-out processing is executed. The setting processing may be executed at timing different from that when the automatic checking-in/-out processing is executed.

Figure 25:
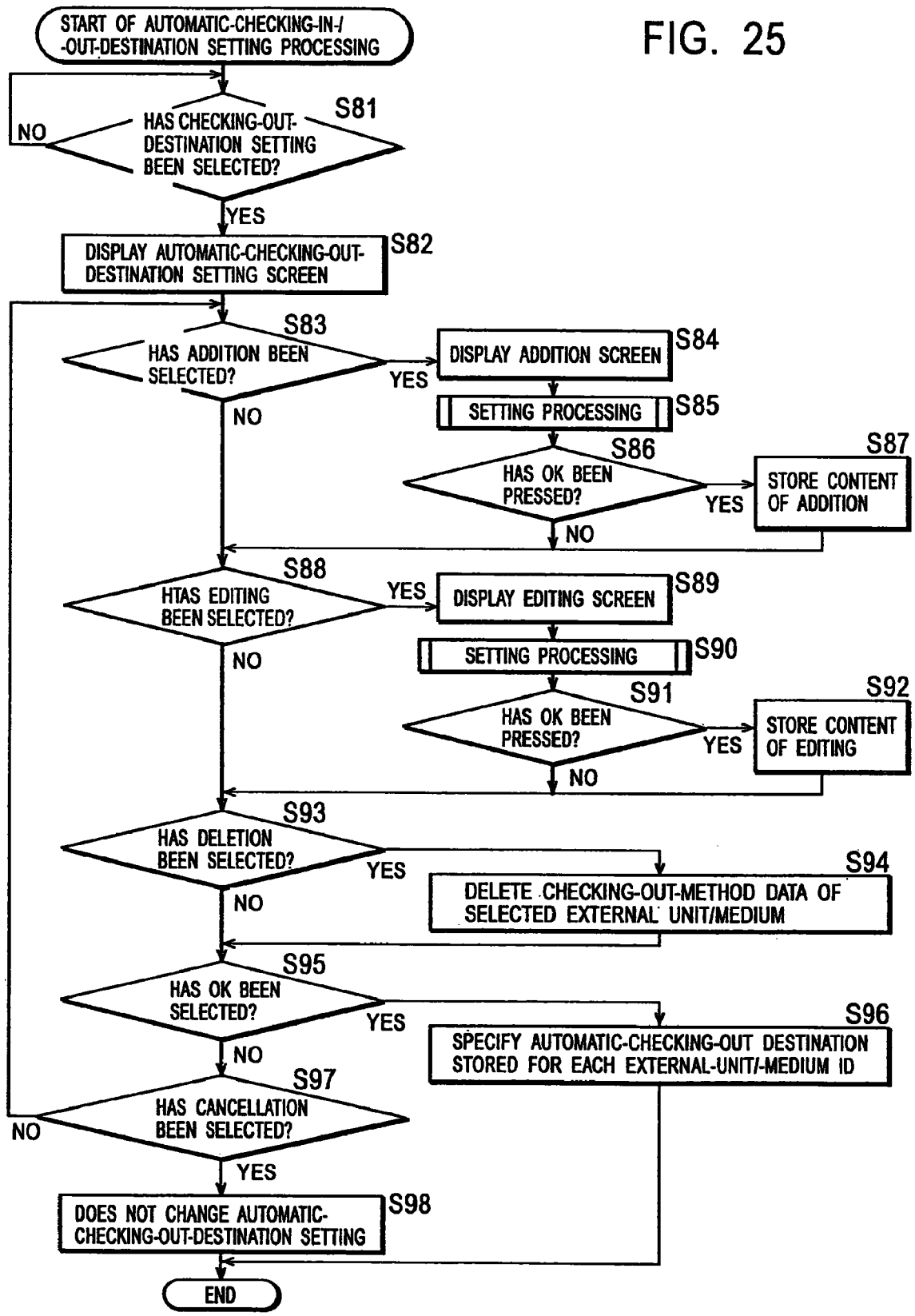
FIG. 25 is a flowchart showing automatic-check-in/check-out destination setting processing.

The automatic-checking-in/-out-destination setting processing will be described below by referring to a flowchart shown in FIG. 25.

In step S81, the GUI section 101 determines whether checking-out-destination setting has been selected, and repeats the process until the checking-out-destination setting is selected. When "AUTOMATIC CHECKING-OUT-DESTINATION SETTING" is selected in the drop down list 231 shown in FIG. 12, for example, the GUI section 101 determines the checking-out-destination setting has been selected. The processing proceeds to step S82.

Figure 26:
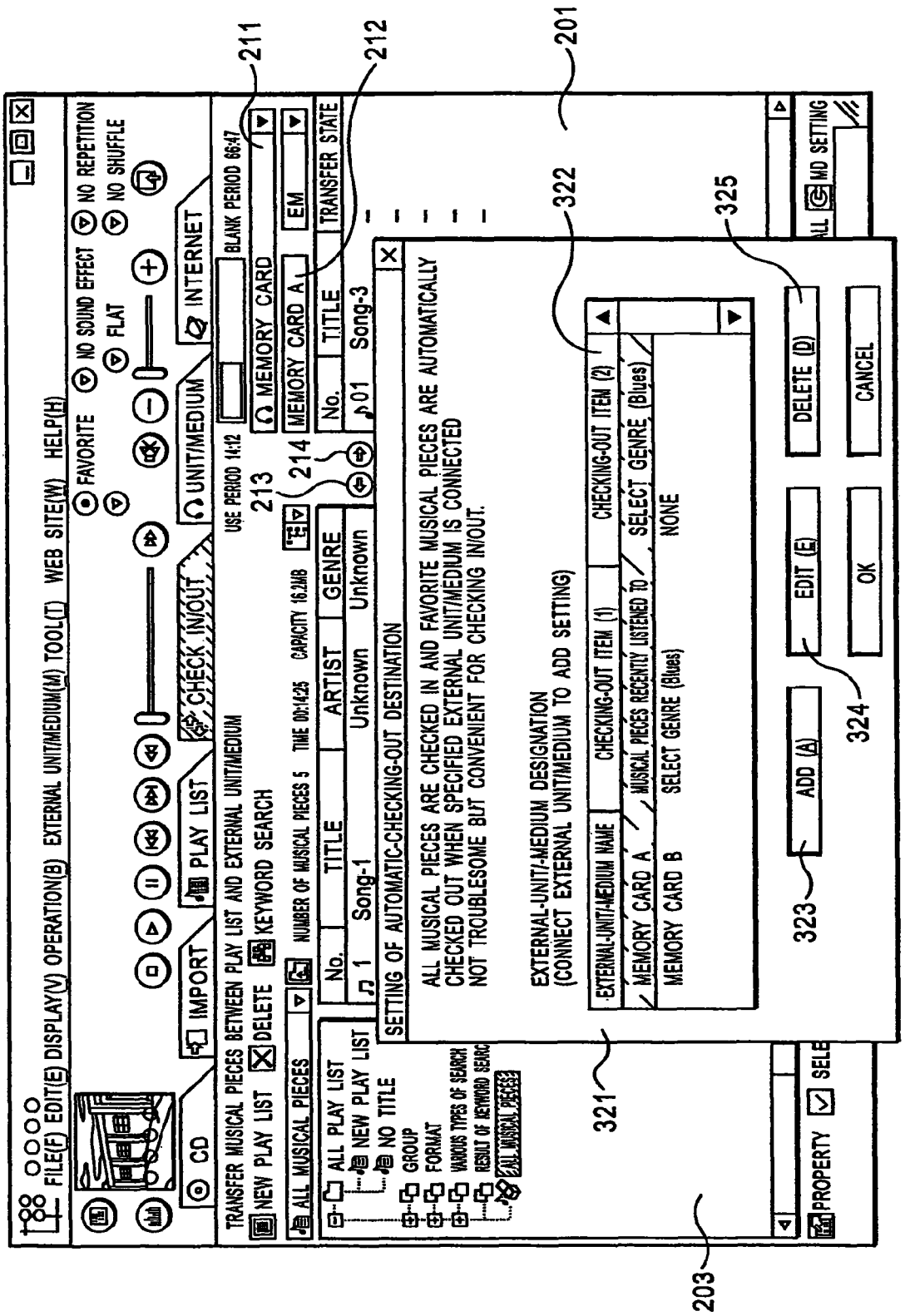
FIG. 26 is a view showing an example screen displayed on the display.

In step S82, the GUI section 101 displays, for example, a dialog box 321 for automatic-checking-out-destination setting, as shown in FIG. 26. In the dialog box 321, the information of checking-out destinations currently stored in the automatic-checking-out-destination storage section 113 is displayed in an external-unit/-medium display column 322. In the external-unit/-medium display column 322, an external-unit/-medium name, checking-out item (1), and checking out (2) are displayed from the left in the figure. The checking-out items (1) and (2) show the information of the checking-out item-1 and item-2 stored in the automatic-checking-out-destination storage section 113. In the current case, it is indicated for the memory card A that "MUSICAL PIECES RECENTLY LISTENED TO" is selected in the checking-out item (1), "SELECT GENRE" is selected in the checking-out item (2), and "Blues" is specified as the genre. It is further indicated for the memory card B that "SELECT GENRE" is selected in the checking-out item (1), "Blues" is selected as the genre, and nothing is specified in the checking-out item (2).

Figure 27:
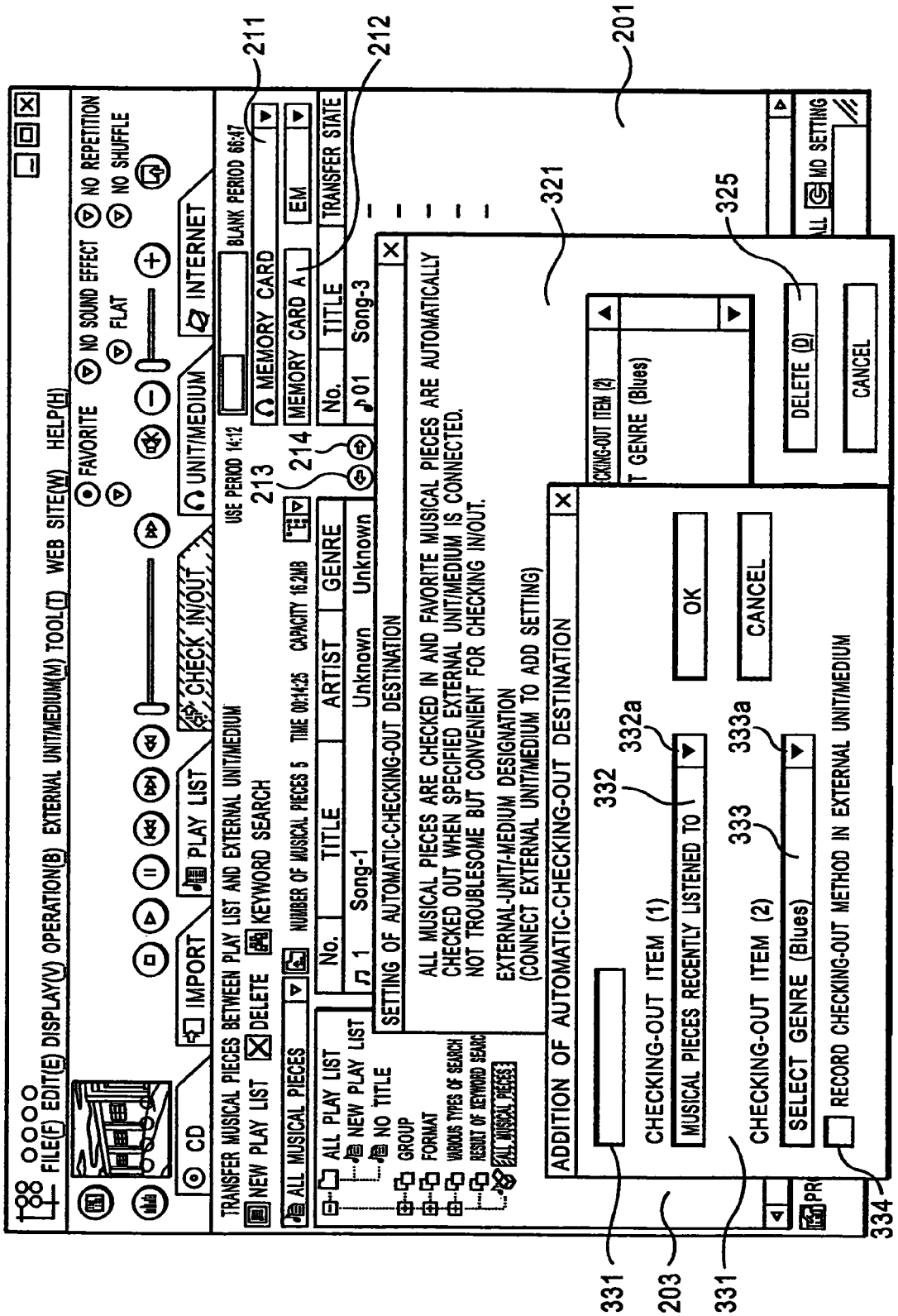
FIG. 27 is a view showing an example screen displayed on the display.

In step S83, the GUI section 101 determines whether addition has been selected. When an ADD button 323 shown in FIG. 26 is pressed, for example, it is determined that addition has been selected. In step S84, the GUI section 101 displays a dialog box 331 for an automatic-checking-out-destination addition, as shown in FIG. 27. The user can input text data which specifies an external unit/medium to be added in an input column 331a on the dialog box.

In step S85, the setting processing is performed. In the current case, checking-out item display columns 322 and 333, and buttons 332a and 333a corresponding to the checking-out item display columns 252 and 291 and the buttons 252a and 291a shown in FIG. 20 are provided. The same processing as that described by referring to the flowchart shown in FIG. 17 is executed, and therefore, a description thereof is omitted. FIG. 27 shows a state in which the MIX button 253 shown in FIG. 20 was pressed. The system may be configured such that, when the user does not want to specify "mix", the user selects "none" in the checking-out item display column 333 to implement the same process.

In step S86, the GUI section 101 determines whether an OK button has been pressed. When it is determined that the OK button has been pressed, the GUI section 101 temporarily stores an addition. The processing proceeds to step S88.

Figure 28:
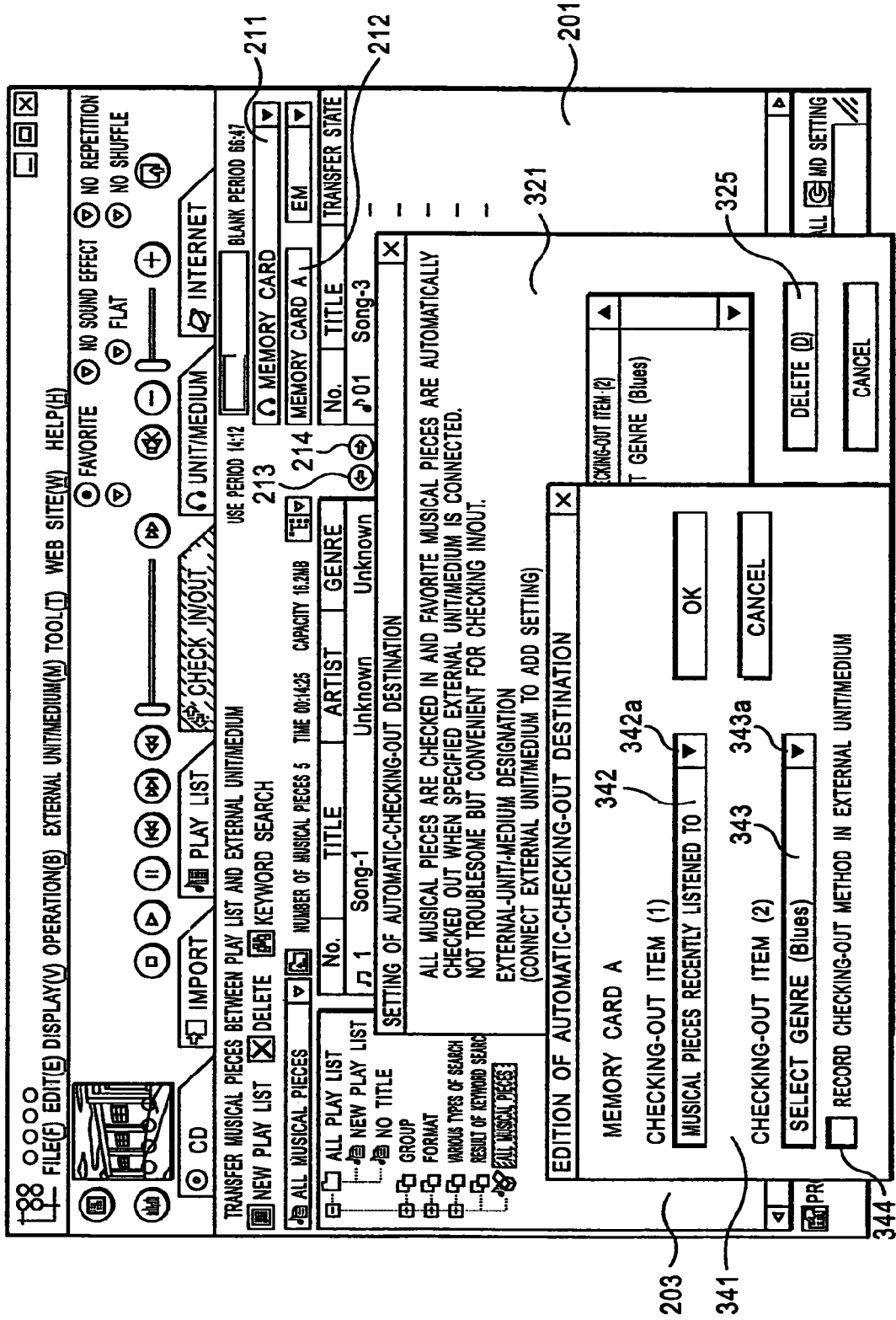
FIG. 28 is a view showing an example screen displayed on the display.

In step S88, the GUI section 101 determines whether editing has been selected. When an EDIT button 326 shown in FIG. 26 is pressed, for example, it is determined that editing has been selected. In step S89, the GUI section 101 displays a dialog box 341 for automatic-checking-out-destination editing, as shown in FIG. 28.

In step S89, the setting processing is executed. In the current case, in the same way as in FIG. 27, checking-out item display columns 342 and 343, and buttons 342a and 343a corresponding to the checking-out item display columns 252 and 291 and the buttons 252a and 291a shown in FIG. 20 are provided. The same processing as that described by referring to the flowchart shown in FIG. 17 is executed, and therefore, a description thereof is omitted. FIG. 28 shows a state in which the MIX button 253 shown in FIG. 20 was pressed. The system may be configured such that, when the user does not want to specify "mix", the user selects "none" in the checking-out item display column 333 to implement the same process.

In step S91, the GUI section 101 determines whether the OK button has been pressed. When it is determined that the OK button has been pressed, the GUI section 101 temporarily stores an addition. The processing proceeds to step S93.

In step S93, the GUI section 101 determines whether deletion has been selected. When a DELETE button 325 shown in FIG. 26 is pressed, for example, it is determined that deletion has been selected. In step S94, the GUI section 101 deletes the checking-out item of the selected external unit/medium and temporarily stores it.

In step S95, the GUI section 101 determines whether OK has been selected. When it is determined that OK has been selected, the GUI section 101 controls the musical-piece management section 104 to store the addition, editing, or deletion information temporarily stored for each external-unit/-medium ID, in the automatic-checking-out-destination storage section 113, and the processing is terminated.

When it is determined in step S95 that OK has not been selected, the GUI section 101 determines in step S97 whether cancellation has been selected. When it is determined that cancellation has been selected, the processing proceeds to step S98.

In step S98, the GUI section 101 does not change the setting contents related to the automatic checking-out destinations, stored in the automatic-checking-out-destination storage section 113, and the processing is terminated.

When it is determined in step S83 that addition has not been selected, the processes of step S84 to step S87 are skipped.

When OK has not been pressed in step S86, that is, cancellation is made, the process of step S87 is skipped.

When it is determined in step S88 that editing has not been selected, the processes of step S89 to step S92 are skipped. When OK has not been pressed in step S91, that is, cancellation is made, the process of step S92 is skipped.

When it is determined in step S93 that deletion has not been selected, the process of step S94 is skipped. When cancellation has not been selected in step S97, the processing returns to step S83 and the subsequent processes are repeated.

In the above case, the automatic-checking-out-destination storage section 113 of the personal computer 1 stores the checking-out items. As shown in FIG. 27 and FIG. 28, for example, the checking-out items can be stored in an external unit/medium (in the current case, in the PD 5) by clicking the mouse at a check box 334 or 344 to input a check mark. With this, even when the PD 5 is connected to a personal computer different from the personal computer 1, in which the checking-out items of the PD 5 have been specified, the above-described processes can be implemented according to the checking-out items.

In the above case, a memory card is used as an example of the PD 5. Other external units or other recording medium, such as an MD (Mini Disc (registered trademark)) may be used.

In the above description, a case in which musical-piece files are used as contents has been explained. The contents are not limited to musical-piece files, but may be image files. In the above description, the automatic checking-out items (methods) include seven items, "musical pieces recently listened to", "musical pieces checked out a small number of times", "musical pieces on a favorite play list", "musical pieces selected at random", "a play list selected at random", "specify genre", and "specify play list". Other methods may be used.

Further, in the above case, two checking-out items can be specified in the "mix" setting. The number of checking-out items to be specified is not limited to this case, but may be more than that. The contents corresponding to the checking-out items may not only output alternately but also checked out in another order.

According to the above description, a process for changing contents recorded in a recording medium by using contents recorded in a personal computer can be executed more easily.

The above-described series of processing can be executed not only by hardware but also by software. When the series of processing is executed by software, a program constituting the software is installed from a recording medium to a computer which is built in special hardware, or to a unit which can execute various functions by installing various programs, such as a general-purpose personal computer.

The recording medium is formed not only of the HDD 21, which has recorded the program and is provided for the user while built in the personal computer in advance as shown in FIG. 2, but also of a package medium recording the program and distributed to the user for providing the program separately from a computer, such as a magnetic disk 41 (including a floppy disk), an optical disk 42 (including a CD-ROM (compact disk read only memory) and a DVD (digital versatile disk)), a magneto-optical disk 43 (including a MD (Mini-disk, registered trademark)), or a semiconductor memory 44 (including a Memory Stick).

In the present specification, steps describing the program stored in the recording medium include not only processes performed time-sequentially in the order of descriptions but also processes not necessarily performed time-sequentially but performed in parallel or separately.

In the present specification, a system refers to the entire structure formed of a plurality of apparatuses.

Industrial Applicability

According to the present invention, a process for changing contents recorded in a recording medium by using recorded contents can be executed more easily.

The invention claimed is:

1. A computer-implemented method for transferring content from an information processing apparatus to a portable device, comprising the steps of:
    detecting by the information processing apparatus a direct local connection between the information processing apparatus and the portable device;
    obtaining a device ID of the portable device when the information processing apparatus is connected to the portable device;
    setting a user-specified rule regarding the content to be directly transferred to the portable device from the information processing apparatus, said setting step being performed prior to detecting said connection and said content being held on said information processing apparatus prior to detecting said connection;
    determining by the information processing apparatus whether the device ID of the portable device is already stored;
    determining by the information processing apparatus whether the portable device has sufficient remaining capacity in which the content can be transferred from the information processing apparatus to the portable device when the device ID of the portable device is already stored; and
    automatically transferring the content to the portable device based on the rule and when the portable device has sufficient remaining capacity.

2. The method according to claim 1, further comprising the step of,
    extracting said content based on a predetermined condition.

3. The method according to claim 2, wherein said predetermined condition includes at least one of contents recently listened to, contents transferred less than a predetermined number of times, contents on a favorite play list, contents selected at random, and genre.

4. The method according to claim 2, wherein said predetermined condition corresponds to one of the device IDs.

5. The method according to claim 1, further comprising the step of, not transferring the content to the portable device when the portable device does not have sufficient remaining capacity.

6. The method according to claim 1, further comprising providing an indication as a function of remaining capacity.

7. A non-transitory computer-readable medium having instructions stored thereon that when executed by a processor perform steps comprising:
    detecting by an information processing apparatus a direct local connection between the information processing apparatus and a portable device;
    obtaining a device ID of the portable device when the direct local connection to the portable device is detected;
    setting a user-specified rule regarding the content to be directly transferred to the portable device from the information processing apparatus, said setting step being performed prior to detecting said direct local connection;

determining by the information processing apparatus whether the device ID of the portable device is already stored;

determining by the information processing apparatus whether the portable device has sufficient capacity in which predetermined content can be transferred from the processing device to the portable device when the device ID of the portable device is already stored; and automatically transferring the predetermined content to the portable device based on the user-specified rule and when the portable device has sufficient remaining capacity.

8. The medium of claim 7, further having instructions stored thereon that when executed by a processor perform a further step comprising extracting said content based on a predetermined condition.

9. The medium according to claim 8, wherein said predetermined condition includes at least one of contents recently listened to, contents transferred less than a predetermined number of times, contents on a favorite play list, contents selected at random, and genre.

10. The medium according to claim 8, wherein said predetermined condition corresponds to one of the device IDs.

11. The medium of claim 7, further comprising the step of not transferring the content to the portable device when the portable device does not have sufficient remaining capacity.

12. The medium according to claim 7, further comprising providing an indication as a function of remaining capacity.

13. An information processing apparatus for storing content, comprising:
a port adapted to connect to a portable device;
a storing unit adapted to store a program having computer readable instructions; and
a processing unit adapted to execute said program stored by the storing unit;
wherein said program when executed by a processor performs steps including:
detecting by the information processing apparatus a direct local connection to the portable device;
obtaining a device ID of the portable device when the connection to the potable device is detected;
setting a user-specified rule regarding the content to be directly transferred to the portable device, said setting step being performed prior to detecting said connection and said content being held on said information processing apparatus prior to detecting said connection;
determining whether the device ID of the portable device is already stored;
determining by the information processing apparatus whether the portable device has sufficient remaining capacity in which the content can be transferred when the device ID of the portable device is already stored; and
automatically transferring the content to the portable device based on the user-specified rule and when the portable device has sufficient remaining capacity.

14. The information processing apparatus of claim 13, wherein the program includes extracting said content based on a predetermined condition.

15. The information processing apparatus of claim 14, wherein said predetermined condition includes at least one of contents recently listened to, contents transferred less than a predetermined number of times, contents on a favorite play list, contents selected at random, and genre.

16. The information processing apparatus of claim 14, wherein said predetermined condition corresponds to one of the device IDs.

17. The information processing apparatus of claim 13, wherein the program includes not transferring the content to the portable device when the portable device does not have sufficient remaining capacity.

18. The information processing apparatus of claim 13, wherein the process includes providing an indication as a function of remaining capacity.

19. An information processing apparatus, comprising:
a port adapted to connect to a portable device;
storing means for storing content and data related to the content;
means for setting a user-specified rule regarding the content to be directly transferred to the portable device;
first determining means for determining in the information processing apparatus whether a direct local connection from the information processing apparatus to the portable device has been detected, said user-specified rule being set prior to said direct local connection being detected and said content being held on said information processing apparatus prior to detecting said connection;
obtaining means for obtaining a device ID of the portable device when the connection to the potable device is detected;
second determining means for determining whether the device ID of the portable device is already stored;
third determining means for determining whether the portable device has sufficient remaining capacity in which the content can be transferred when the device ID of the portable device is already stored; and
transferring means for automatically transferring the content to the portable device based on the user-specified rule and when it is determined that the portable device has sufficient remaining capacity.

20. The information processing apparatus of claim 19, further comprising means for extracting said content based on a predetermined condition.

21. The information processing apparatus of claim 20, wherein said predetermined condition includes at least one of contents recently listened to, contents transferred less than a predetermined number of times, contents on a favorite play list, contents selected at random, and genre.

22. The information processing apparatus of claim 20, wherein said predetermined condition corresponds to one of the device IDs.

23. The information processing apparatus of claim 19, wherein the transferring means includes not transferring the content to the portable device when the portable device does not have sufficient remaining capacity.

24. The information processing apparatus of claim 19, further comprising means for providing an indication as a function of remaining capacity.

25. A portable device comprising:
a connector adapted to directly connect the portable device to an information processing apparatus;
a first transferring unit adapted to transfer a device ID of the portable device to the information processing apparatus when a direct local connection between the information processing apparatus and the portable device is detected by the information processing apparatus;
a storing unit adapted to store content from the information processing apparatus according to a user-specified rule regarding the content to be directly transferred, said user-specified rule being set prior to said direct local connection being detected and said content being held on said information processing apparatus prior to detecting said connection; and a reproducing unit adapted to reproduce the content stored in the storing unit that was directly transferred from the information processing apparatus, wherein said content is automatically transferred to the portable device based on the user-specified rule and when the device ID of the portable device is already stored by the information processing apparatus and the information processing apparatus determines that the portable device has sufficient storage capacity for said content.

26. The portable device of claim 25, wherein said content is extracted based on a predetermined condition.

27. The portable device of claim 26, wherein the said predetermined condition includes at least one of contents recently listened to, contents transferred less than a predetermined number of times, contents on a favorite play list, contents selected at random, and genre.

28. The portable device of claim 26, wherein said predetermined condition corresponds to one of the device IDs.

29. The portable device of claim 25, wherein the content is not sent to the portable device when the portable device does not have sufficient remaining capacity.

30. The portable device of claim 25, wherein the transferring unit includes providing an indication as a function of remaining capacity.

31. A method of storing content to a portable device comprising the steps of:

directly connecting the portable device to an information processing apparatus;

transferring a device ID of the portable device to the information processing apparatus when a direct local connection to the portable device is detected by the information processing apparatus;

storing the content from the information processing apparatus to a user-specified rule regarding the content to be directly transferred, said user-specified rule being set prior to said direct local connection being detected; and reproducing the content stored in said storing step that was sent from the information processing apparatus, wherein said content is automatically transferred to the portable device based on the user-specified rule and when the device ID of the portable device is already stored by the information processing apparatus and the information processing apparatus determines that the portable device has sufficient storage capacity for said content.

32. The method of claim 31, further comprising extracting said content based on a predetermined condition.

33. The method of claim 32, wherein said predetermined condition includes at least one of contents recently listened to, contents transferred less than a predetermined number of times, contents on a favorite play list, contents selected at random, and genre.

34. The method of claim 32, wherein said predetermined condition corresponds to one of the device IDs.

35. The method of claim 31, further comprising the step of not transferring the content to the portable device when the portable device does not have sufficient remaining capacity.

36. The method of claim 31, further comprising providing an indication as a function of remaining capacity.

37. A method for transferring content from an information processing apparatus to a portable device, comprising the steps of:

detecting by the information processing apparatus a direct local connection from the information processing apparatus to the portable device;

obtaining a device ID of the portable device when the direct local connection to the portable device is detected;

setting a user specified rule regarding the content to be directly transferred to the portable device, said setting step being performed prior to detecting said direct local connection and said content being held on said information processing apparatus prior to detecting said connection;

determining by the information processing apparatus whether the device ID of the portable device is already stored prior to said detecting step, and automatically transferring an image file from the information processing apparatus to the portable device based on the user-specified rule and when the device ID of the portable device is already stored and the information processing apparatus determines the portable device has sufficient capacity to hold the image file.

38. An apparatus in an information processing apparatus for transferring content from the information processing apparatus to a portable device, comprising:

a detecting unit adapted to detect at the information processing apparatus a direct local connection from the information processing apparatus to the portable device;

an obtaining unit adapted to obtain a device ID of the portable device when the direct local connection to the portable device is detected;

a rule setting unit that sets a user-specified rule for governing the content to be directly transferred to the portable unit, said user-specified rule being set prior to said detecting unit detecting said direct local connection and said content being held on said information processing apparatus prior to detecting said connection;

a determining unit adapted to determine whether the device ID of the portable device is already stored in the information processing apparatus prior to said detecting unit detecting said direct local connection, a storage unit configured to store the content;

a transfer mechanism configured to transfer an image file automatically to the portable device based on the user-specified rule and, when the device ID of the portable device is already stored and the information processing apparatus determines the portable device has sufficient capacity to hold the image file.

39. A computer-based information processing method for transferring content from an information processing apparatus to a portable device, comprising the steps of:

detecting by the information processing apparatus a direct local connection from the information processing apparatus to the portable device;

obtaining a device ID of the portable device when the direct local connection to the portable device is detected;

setting a user-specified rule regarding the content to be transferred to the portable device, said setting step being performed prior to detecting said direct local connection and said content being held on said information processing apparatus prior to detecting said connection;

determining whether the device ID of the portable device is stored;

determining whether the portable device has sufficient remaining capacity in which a predetermined image file can be directly transferred from the information processing device when the device ID of the portable device is already stored; and automatically transferring the image file to the portable device based on the user-specified rule and when the portable device has sufficient remaining capacity.

40. A computer-based information processing apparatus for transferring content from the information processing apparatus to a portable device, comprising:
   a detecting unit adapted to detect at the information processing apparatus a direct local connection from the information processing apparatus to the portable device;
   an obtaining unit adapted to obtain a device ID of the portable device when the direct local connection to the portable device is detected;
   a user-specified rule setting unit that sets a rule for governing the content to transfer to the portable unit, said user-specified rule being set prior to said detecting unit detecting said direct local connection and said content being held on said information processing apparatus prior to detecting said connection;
   a first determining unit adapted to determine whether the device ID of the portable device is already stored in the information processing apparatus; and
   a second determining unit adapted to determine whether the portable device has sufficient remaining capacity in which a predetermined image file can be transferred when the device ID of the portable device is already stored, and
   a storage unit configured to store the content;
   wherein the image file is automatically transferred to the portable device, based on the user-specified rule and when the portable device has sufficient remaining capacity.

41. An apparatus as part of an information processing apparatus comprising:
   a memory; and
   at least one processor, coupled to the memory, programmed to
      detect at the information processing apparatus a direct local connection between the information processing apparatus and a portable device;
      obtain a device ID of the portable device when the information processing apparatus is connected to the portable device;
      set a user-specified rule for the content to be transferred to the portable unit, said rule being set prior to said direct local connection being detected and said content being held on said information processing apparatus prior to detecting said connection;
      determine whether the device ID of the portable device is already stored in the information processing apparatus;
      determine whether the portable device has sufficient remaining capacity in which the predetermined content can be transferred from the information processing apparatus to the portable device when the device ID of the portable device is already stored; and
      automatically transfer the content to the portable device based on the user-specified rule and when the portable device has sufficient remaining capacity.

42. The apparatus as claimed in claim 41, further comprising:
   not transferring the content to the portable device when the portable device does not have sufficient remaining capacity.

43. The apparatus of claim 41, being configured to extract said content based on a predetermined condition.

44. The apparatus of claim 43, wherein said predetermined condition includes at least one of contents recently listened to, contents transferred less than a predetermined number of times, contents on a favorite play list, contents selected at random, and genre.

45. The apparatus of claim 43, wherein the predetermined condition corresponds to one of the device IDs.

46. The apparatus of claim 41, further configured to provide an indication as a function of remaining capacity.

47. An apparatus as part of an information processing apparatus comprising:
   a memory; and
   at least one processor, coupled to the memory, programmed to
      detect at the information processing apparatus a direct local connection from the information processing apparatus to a portable device;
      obtain a device ID of the portable device when the direct local connection to the portable device is detected;
      set a user-specified rule for the content to be transferred to the portable unit, said rule being set prior to said direct local connection being detected and said content being held on said information processing apparatus prior to detecting said connection;
      determine whether the device ID of the portable device is already stored in the information processing apparatus;
      determine whether the portable device has sufficient remaining capacity in which a predetermined image file can be directly transferred to the portable device when the device ID of the portable device is already stored; and
      automatically transfer the image file to the portable device based on the user-specified rule and when the portable device has sufficient remaining capacity.

48. The apparatus as claimed in claim 47, further comprising program code for not transferring the image file to the portable device when the portable device does not have sufficient remaining capacity.

* * * * *